US012393882B2

(12) United States Patent
Yamaguchi et al.

(10) Patent No.: US 12,393,882 B2
(45) Date of Patent: Aug. 19, 2025

(54) TIME SERIES ANALYSIS USING A SHAPELET LEARNING METHOD WITH AREA UNDER THE CURVE

(71) Applicant: KABUSHIKI KAISHA TOSHIBA, Minato-ku (JP)

(72) Inventors: Akihiro Yamaguchi, Kita (JP); Shigeru Maya, Yokohama (JP); Kohei Maruchi, Setagaya (JP); Tatsuya Inagi, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 1101 days.

(21) Appl. No.: 16/815,358

(22) Filed: Mar. 11, 2020

(65) Prior Publication Data

US 2020/0311576 A1 Oct. 1, 2020

(30) Foreign Application Priority Data

Apr. 1, 2019 (JP) ................................ 2019-069660

(51) Int. Cl.
*G06N 20/10* (2019.01)

(52) U.S. Cl.
CPC .................................. *G06N 20/10* (2019.01)

(58) Field of Classification Search
CPC ..................................................... G06N 20/10
USPC ........................................................... 706/11
See application file for complete search history.

(56) References Cited

U.S. PATENT DOCUMENTS 8,510,288 B2 * 8/2013 Mital ...................... G06F 40/18 707/708
2017/0227584 A1 8/2017 Suehiro et al.
2018/0349320 A1 * 12/2018 Yamaguchi ........... G06N 20/00

FOREIGN PATENT DOCUMENTS

JP 2017-138929 A 8/2017

OTHER PUBLICATIONS

Paparrizos, John, and Luis Gravano. "k-shape: Efficient and accurate clustering of time series." Proceedings of the 2015 ACM SIGMOD international conference on management of data. 2015. (Year: 2015).*

(Continued)

*Primary Examiner* — Kakali Chaki
*Assistant Examiner* — Michael H Hoang
(74) *Attorney, Agent, or Firm* — Oblon, McClelland, Maier & Neustadt, L.L.P.

(57) ABSTRACT

A time series data analysis method, includes: generating a plurality of first feature vectors including feature amounts of a plurality of feature waveforms, based on distances from a plurality of first time series data sequences to the plurality of feature waveforms, the first time series data sequences belonging to a first class; generating a plurality of second feature vectors including feature amounts of the plurality of feature waveforms, based on distances from a plurality of second time series data sequences to the plurality of feature waveforms, the plurality of second time series data sequences belonging to a second class; and updating the plurality of feature waveforms, based on the plurality of first feature vectors, the plurality of second feature vectors, a performance indicator parameter related to a performance indicator for a classification model and a model parameter including weights on the plurality of feature waveforms.

7 Claims, 21 Drawing Sheets

12: UPDATE PROCESSOR
10 INPUT SETTER
11 FEATURE VECTOR GENERATOR
13 WEIGHT UPDATER
14 FEATURE WAVEFORM UPDATER
15 UPDATE TERMINATION DETERMINER
20 OUTPUT INFORMATION STORAGE
18 LEARNING DATA STORAGE
19 TEST DATA STORAGE
16 PREDICTOR
17 DISPLAY

(56) References Cited

OTHER PUBLICATIONS

Yamaguchi, Akihiro, and Takeichiro Nishikawa. "One-class learning time-series shapelets." 2018 IEEE International Conference on Big Data (Big Data). IEEE, 2018. (Year: 2018).*
Zhang, Qin, et al. "Unsupervised Feature Learning from Time Series." Proceedings of the Twenty-Fifth International Joint Conference on Artificial Intelligence (IJCAI-16) pp. 2322-2328. 2016. (Year: 2016).*
Yao, Yukai, et al. "K-SVM: An Effective SVM Algorithm Based on K-means Clustering." J. Comput. 8.10 (2013): 2632-2639. (Year: 2013).*
Ma, Hua, et al. "On use of partial area under the ROC curve for evaluation of diagnostic performance." Statistics in medicine 32.20 (2013): 3449-3458. (Year: 2013).*
Schmidt, Mark. "Least squares optimization with L1-norm regularization." CS542B Project Report 504 (2005): 195-221. (Year: 2005).*
Patri, Om P., et al. "Extracting discriminative shapelets from heterogeneous sensor data." 2014 IEEE International Conference on Big Data (Big Data). IEEE, 2014. https://ieeexplore.ieee.org/stamp/stamp.jsp?tp=&arnumber=7004344 (Year: 2014).*
Goksuluk, Dincer, et al. "easyROC: an interactive web-tool for ROC curve analysis using R language environment." R J. 8.2 (2016): 213. (Year: 2016) https://www.researchgate.net/profile/Dincer-Goksuluk-2/publication/314124083 easyROC_An_Interactive_Web-tool_for_ROC_Curve_Analysis_Using_R_Language_Environment/links/58b6c2cf92851c471d476927/easyROC-An-Interactive-Web-tool-for-ROC-Curve-Analysis-Using-R-Language-Environment.pdf (Year: 2016).*
Sheikhpour, Razieh, et al. "A survey on semi-supervised feature selection methods." Pattern Recognition 64 (2017): 141-158. https://www.sciencedirect.com/science/article/pii/S0031320316303545 (Year: 2017).*
Mori, Usue, Alexander Mendiburu, and José Antonio Lozano. "Distance Measures for Time Series in R: The TSdist Package." R J. 8.2 (2016): 451. (Year: 2016) https://www.researchgate.net/profile/L-Sanabria/post/Best-way-to-handle-the-statistical-analysis-of-two-curves/attachment/59d64f4579197b80779a8737/AS%3A496936331509761%401495490262809/download/TSdist.pdf (Year: 2016).*
Gadat, Sébastien, and Laurent Younes. "A stochastic algorithm for feature selection in pattern recognition." Journal of Machine Learning Research 8 (2007): 509-547. https://www.jmlr.org/papers/volume8/gadat07a/gadat07a.pdf (Year: 2007).*
Border, Benjamin, and R. Andrew Russell. "Novelty Based Learning of Primitive Manipulation Strategies." Australasian Conference on Robotics and Automation 2012. Australian Robotics and Automation Association (ARAA), 2012. https://www.araa.asn.au/acra/acra2012/papers/pap157.pdf (Year: 2012).*
Dudley, John J., and Per Ola Kristensson. "A review of user interface design for interactive machine learning." ACM Transactions on Interactive Intelligent Systems (TiiS) 8.2 (2018): 1-37. https://dl.acm.org/doi/pdf/10.1145/3185517 (Year: 2018).*
Narasimhan, Harikrishna, and Shivani Agarwal. "Support Vector Algorithms for Optimizing the Partial Area Under the ROC Curve." arXiv preprint arXiv:1605.04337 (2016). https://arxiv.org/pdf/1605.04337 (Year: 2016).*
Grabocka, J. et al., "Learning Time-Series Shapelets," Proceedings of the $20^{th}$ ACM SIGKDD International Conference on Knowledge Discovery and Data Mining, https://doi.org/10.1145/2623330.2623613, Aug. 2014, 10 pages.
Narasimhan, H. et al., "SVMpAUC tight: A New Support Vector Method for Optimizing Partial AUC Based on a Tight Convex Upper Bound," Proceedings of the $19^{th}$ ACM SIGKDD International Conference on Knowledge Discovery and Data Mining, https://doi.org/10.1145/2487575.2487674, Aug. 2013, pp. 167-175.
Narasimhan, H. et al., "A Structural SVM Based Approach for Optimizing Partial AUC," Proceedings of the 30th International Conference on International Conference on Machine Learning, vol. 28, Jun. 2013, 9 pages.
Raychaudhuri, D. S. et al., "Channel masking for multivariate time series shapelets," arXiv:1711.00812v1 [cs.LG], Nov. 2, 2017, 12 pages.
Duchi, J. et al., "Efficient Projections onto the 11-Ball for Learning in High Dimensions," Proceedings of the 25th international conference on Machine learning, https://doi.org/10.1145/1390156.1390191, Jul. 2008, 8 pages.

* cited by examiner

REPRESENTATIVE POSITIVE-LABELED TIME SERIES DATA SEQUENCE AND FEATURE WAVEFORM

REPRESENTATIVE NEGATIVE-LABELED TIME SERIES DATA SEQUENCE AND FEATURE WAVEFORM

X2

X1

TIME SERIES ANALYSIS USING A SHAPELET LEARNING METHOD WITH AREA UNDER THE CURVE

CROSS REFERENCE TO RELATED APPLICATIONS

This application is based upon and claims the benefit of priority from the prior Japanese Patent Application No. 2019-069660, filed on Apr. 1, 2019, the entire contents of which are incorporated herein by reference.

FIELD

Embodiments of the present invention relate to a time series data analysis method, a time series data analysis apparatus, and a non-transitory computer readable medium.

BACKGROUND

In binary classification, which classifies time series data sequences such as sensor data sequences into two normal and anomalous classes, it is necessary to clarify evidence for prediction, in addition to performance of the prediction.

For binary classification technology for clarifying evidence for prediction on time series data sequences, a method in which in addition to a classification model, feature waveforms (shapelets) that are partial waveform patterns effective in prediction are concurrently learnt, has vigorously been studied in recent years. Such a method is called a shapelet learning method. Feature waveforms are used to predict presence or absence of anomaly and also as evidence for prediction.

For a performance indicator for classification and prediction such as ranking, AUC (Area Under the Curve) is often used. An AUC is an area between a ROC (Receiver Operating Characteristics) curve and a horizontal axis, and the ROC is a curve with false positive rate on a horizontal axis and true positive rate on a vertical axis.

There are also many cases where by narrowing the false positive rates down to a small range, an area within the range, that is, pAUC (partial AUC) is used for an evaluation indicator. For example, pAUC is used for a performance indicator when correct prediction of troubles is desired under a situation where a rate of overlooking troubles is kept at a sufficiently low level, when correct prediction of diagnosis cases is desired under a situation where a rate of misdiagnoses is restrained to a low level, when enhanced accuracy in prediction of a small number of higher rankings is desired, and the like.

However, for a problem of time series data classification, no method has been provided in which a classification model is learnt such that a performance indicator such as pAUC or AUC is optimized. No method has been provided either in which feature waveforms as evidence for prediction are concurrently learnt while a performance indicator is optimized.

DETAILED DESCRIPTION

According to one embodiment, a time series data analysis method, includes: generating a plurality of first feature vectors including feature amounts of a plurality of feature waveforms, based on distances from a plurality of first time series data sequences to the plurality of feature waveforms, the first time series data sequences belonging to a first class; generating a plurality of second feature vectors including feature amounts of the plurality of feature waveforms, based on distances from a plurality of second time series data sequences to the plurality of feature waveforms, the plurality of second time series data sequences belonging to a second class; and updating the plurality of feature waveforms, based on the plurality of first feature vectors, the plurality of second feature vectors, a performance indicator parameter related to a performance indicator for a classification model and a model parameter including weights on the plurality of feature waveforms.

Hereinafter, embodiments of the present invention will be described with reference to drawings.

First Embodiment

Figure 1:
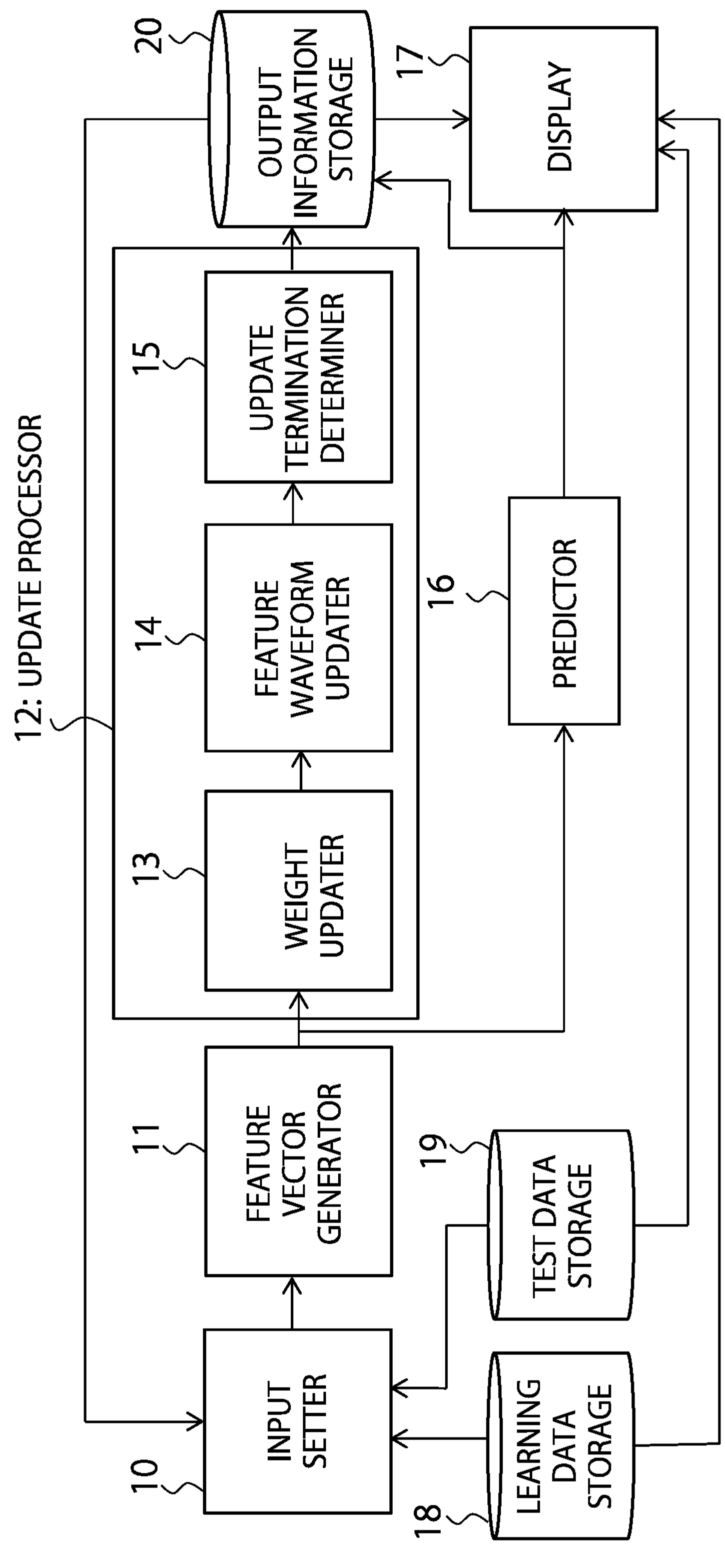
FIG. 1 is a block diagram showing a time series data analysis apparatus according to a first embodiment.

FIG. 1 is a block diagram showing a time series data analysis apparatus according to an embodiment of the present invention. The time series data analysis apparatus in FIG. 1 includes an input setter 10, a feature vector generator 11, an update processor 12, a predictor 16, a display 17, a learning data storage 18, a test data storage 19, and an output information storage 20. The update processor 12 includes a weight updater 13, a feature waveform updater 14, and an update termination determiner 15.

The time series data analysis apparatus has a learning phase and a test phase. In the learning phase, a model parameter for a classification model and a plurality of feature waveforms are leant based on time series data sequences for learning and a performance indicator parameter, which is a parameter related to a performance indicator for the classification model. The model parameter includes weights on the plurality of feature waveforms. In the test phase, a class of a time series data sequence to be tested is predicted by using the model parameter and the plurality of feature waveforms leant in the learning phase, whereby it is determined whether or not the time series data sequence to be tested includes anomaly.

Hereinafter, the apparatus will be described in detail, in the learning phase and the test phase separately.

<Learning Phase>

The learning data storage 18 stores input data for learning. For the input data for learning, a binary-labeled time series data sequence set for learning, parameter information related to time series data sequences, parameter information related to feature waveforms (shapelets), information on the performance indicator for the classification model, and information on a parameter related to the performance indicator (performance indicator parameter) are stored.

The learning data storage 18 stores the binary-labeled time series data sequence set for learning and the parameter information related to time series data sequences. The time series data sequences are, as an example, time series data sequences based on values detected by a sensor provided to an analysis-target apparatus. The time series data sequences may be the values detected by the sensor, may be statistical values (means, maximums, minimums, standard deviations, or the like) of the detected values, or may be resultant values of calculation (for example, power obtained by multiplying voltage by current) of values detected by a plurality of sensors.

The time series data sequences for learning are supervised time series data sequences and labeled with two values representing normal and anomalous. As an example, a label value of a normal label is "1", and a label value of an anomalous label is "−1", but the label values are not limited to such values. A time series data sequence assigned a normal label (first time series data sequence) belongs to a normal class. A time series data sequence assigned an anomalous label belongs to an anomalous class.

As an example, the normal class corresponds to a first class, and the anomalous class corresponds to a second class. A time series data sequence belonging to the first class corresponds to a first time series data sequence. A time series data sequence belonging to the second class corresponds to a second time series data sequence.

The parameter information related to time series data sequences is information on the number of the time series data sequences and the length of each time series data sequence. In a description below, the time series data sequence set is denoted by "T", and the number of the time series data sequences is denoted by "I". The length of each time series data sequence is denoted by "Q". In other words, each time series data sequence is data including Q points. The time series data sequence set T can be represented by an I×Q matrix.

Figure 2:
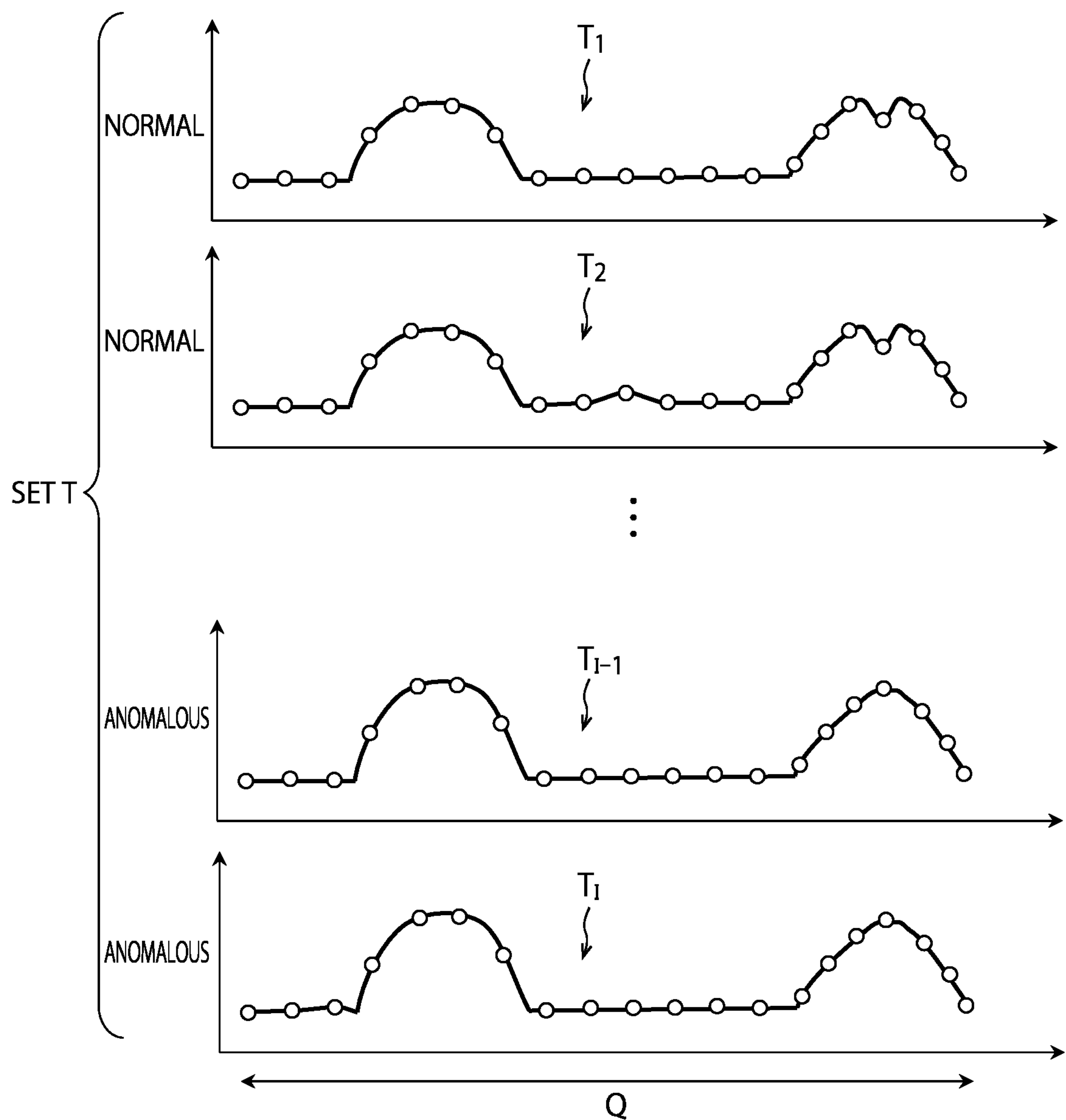
FIG. 2 shows an example of a time series data sequence set stored in a learning data storage.

FIG. 2 shows an example of the time series data sequence set T stored in the learning data storage 18. The set T includes the I time series data sequences. Each time series data sequence has the same length Q. In other words, each time series data sequence includes Q points. FIG. 2 shows examples in each of which Q points are connected through a line. Each time series data sequence is denoted by "$T_{i(i=1, 2, \ldots, I)}$". An arbitrary time series data sequence is expressed as a time series data sequence i. Although each time series data sequence has the same length Q in the present embodiment, extension to a case of time series data sequences that have different lengths is also possible. It is assumed that each time series data sequence is sampled at equal intervals, with no missing data. When there is missing data, the data may be interpolated through interpolation processing.

For the parameter information related to feature waveforms (shapelets), the learning data storage 18 stores the number of the feature waveforms and a value indicating the length of each feature waveform. The number of the feature waveforms is denoted by "K", and the length of each feature waveform is denoted by "L". "L" is a value smaller than "Q", which is the length of the time series data sequences.

Each feature waveform is data including L points. Assuming that a feature waveform set is "S", "S" is a K×L matrix. The feature waveforms correspond to what is called shapelets in a time series shapelets method (TSS method). After an initial shape of a feature waveform is determined when the learning phase is started, the feature waveform is repeatedly updated, which will be describe later.

Figure 3:
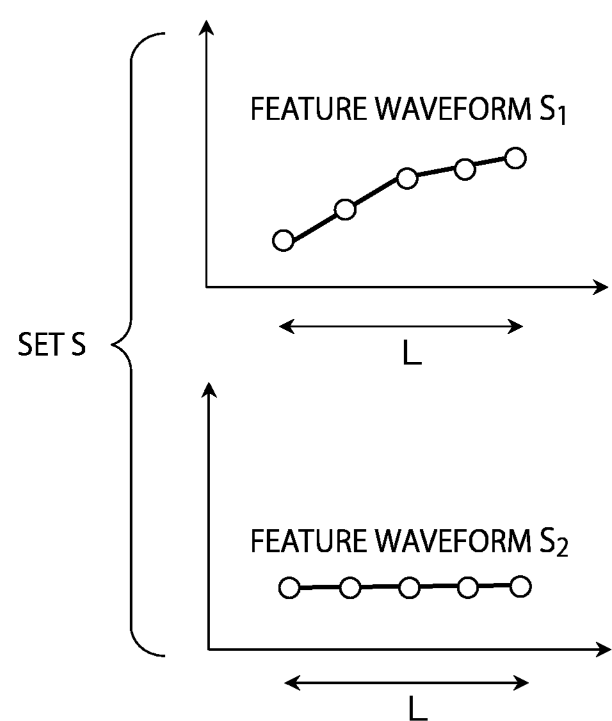
FIG. 3 shows an example of a feature waveform set including two feature waveforms.

FIG. 3 shows an example of the feature waveform set S including two (K=2) feature waveforms. The length of each feature waveform is "L". The feature waveforms are denoted by "$S_1$", "$S_2$", respectively. Although each feature waveform has the same length L in the present embodiment, extension to a case of feature waveforms that have different lengths is also possible.

Here, a distance between a time series data sequence i and a feature waveform k will be described. The distance between the time series data sequence i and the feature waveform k is defined as a smallest distance among respective distances between time series subsequences, each of which is a section of the length L in the time series data sequence i, and the feature waveform k. More specifically, in the time series data sequence i, an offset, which is a length from a starting location (leading point) of a waveform, is sequentially moved toward an ending point of the waveform. A distance between a time series subsequence that is a section of the length L from each offset location and the feature waveform k is calculated. Then, a smallest distance is determined as the distance between the time series data sequence i and the feature waveform k. The smaller the distance is, the more closely the feature waveform k fits the time series data sequence. Euclidean distance is used for the distance. However, any types of distance may be used as long as the distance can evaluate degrees of fittingness between waveforms.

The distance between a time series subsequence that is a section of the length L from the offset j in the time series data sequence i and the feature waveform k is calculated using a following equation (1).

[Expression 1]

$$D_{i,k,j} = \frac{1}{L}\sum_{l=1}^{L}(T_{i,j+l-1} - S_{k,l})^2 \tag{1}$$

"$T_{i,j+l-1}$" represents a value of an (l−1)-th location counted from the location of the offset j in the time series data sequence i included in the time series data sequence set T. "$S_{k,l}$" represents a value of an l-th location counted from the leading point of the feature waveform k included in the feature waveform set S. "$D_{i,k,j}$" corresponds to an average distance between each time series subsequence (partial waveform) that is a section of the length L from the offset j in the time series data sequence i and the feature waveform k.

The distance between the time series data sequence i and the feature waveform k is calculated based on the above equation (1), using a following equation (2).

[Expression 2]

$$X_{i,k} = \min_{j=1,\ldots,Q-L+1} \frac{1}{L} \sum_{l=1}^{L} (T_{i,j+l-1} - S_{k,l})^2 \tag{2}$$

In the learning phase, learning of the model parameter for the classification model and learning of the feature waveform set S are performed. For the classification model, a support vector machine (SVM) model is assumed. In such a case, the model parameter corresponds to a weight vector W for a classification boundary. The weight vector W is a K-dimensional vector and includes K weights on the feature waveforms. The feature waveform set S is the K×L matrix. As mentioned above, "K" denotes the number of the feature waveforms, and "L" denotes the length of the feature waveforms.

The learning data storage 18 stores the performance indicator for evaluating performance of the classification model in learning, and the parameter related to the performance indicator (performance indicator parameter). Here, as examples of the performance indicator and the performance indicator parameter, pAUC (partial Area Under the ROC curve) and a parameter specifying a range of false positive rate are used, respectively. The false positive rate is a rate of incorrectly predicting that a label of negative-labeled data is a positive label. In other words, the false positive rate is a rate of predicting that a class of data belonging to the anomalous class is the normal class.

Here, the ROC curve, AUC, and pAUC will be described using FIG. 4.

Figure 4:
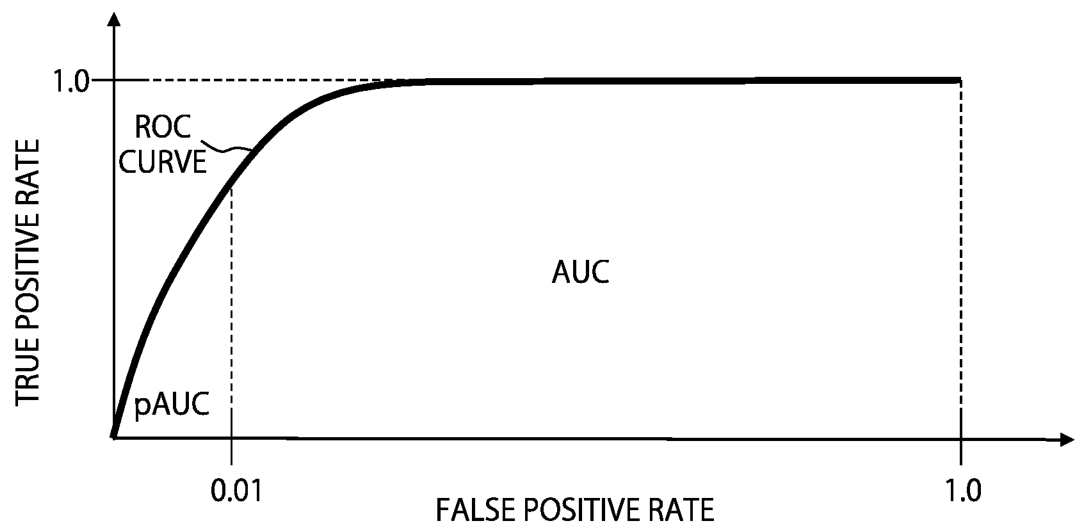
FIG. 4 is a diagram for describing a ROC curve, AUC, and pAUC.

FIG. 4 schematically shows a ROC curve, AUC, and pAUC. The ROC curve is a graph drawn in a coordinate system with the true positive rate on a vertical axis and the false positive rate on a horizontal axis. The true positive rate is a rate of correctly predicting that a label of positive-labeled data is a positive label. In other words, the true positive rate is a rate of predicting that a class of data belonging to the normal class is the normal class. The prediction is performed by comparing an output value (score) of the classification model with a threshold value. When the score is not smaller than the threshold value, data is determined as normal (a positive label is predicted), and when the score is smaller than the threshold value, data is determined as anomalous (a negative label is predicted). For example, a ROC curve is drawn by varying the threshold value from a maximum value to a minimum value of the score.

It is assumed that the number of incorrect predictions that a label of negative-labeled data is a positive label is "FP", the number of correct predictions that a label of positive-labeled data is a positive label is "TP", the number of incorrect predictions that a label of positive-labeled data is a negative label is "EN", and the number of correct predictions that a label of negative-labeled data is a negative label is "TN". The true positive rate can be calculated as "TP/(TP+FN)", and the false positive rate can be calculated as "FP/(FP+TN)".

AUC is an area under the ROC curve, that is, an area of a region confined by the ROC curve and the false-positive-rate axis.

pAUC is an area of a region confined by a specified range of the false positive rate on the horizontal axis and the ROC curve. The range of the false positive rate on the horizontal axis is not smaller than 0 and not larger than 1, and the above specified range is specified by the performance indicator parameter. For example, the range is not smaller than 0 and not larger than 0.1. However, such a range is an example, and the range may be any other range such as a range not smaller than 0 and not larger than 0.05, or a range not smaller than 0 and not larger than 0.01.

Although pAUC and a range of the false positive rate are used for the performance indicator and the performance indicator parameter, respectively, here, other performance indicators may be used. For example, a performance indicator and a performance indicator parameter based on the false negative rate may be defined and used. The false negative rate is a rate of incorrectly predicting that a label of positive-labeled data is a negative label.

An operator (user) of the apparatus may set the input data for learning in the learning data storage 18 via a GUI (Graphical User Interface). In such a case, the GUI is displayed in a screen of the display 17.

Figure 5:
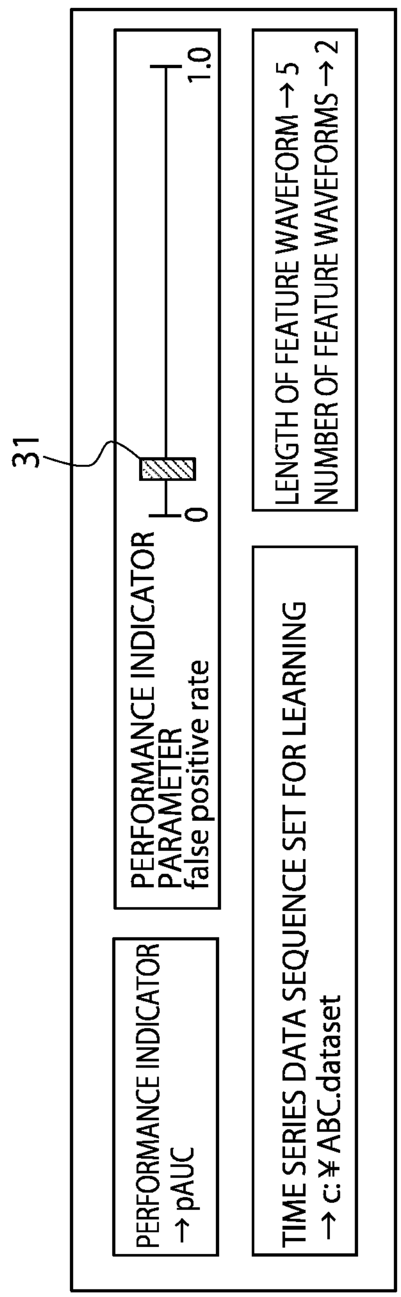
FIG. 5 shows an example of a GUI screen.

FIG. 5 shows an example of the GUI screen. pAUC is designated as the performance indicator. A range of the false positive rate is designated as the performance indicator parameter by adjusting a position of an adjustment bar 31. A lower limit value of the false positive rate is zero, and an upper limit value (β) of the range is specified here. In the example shown in FIG. 5, it is specified that the upper limit value (β) is 0.01. Note that a possibility is not excluded that the lower limit value of the range of the false positive rate is larger than zero. The upper limit value β (the range of the false positive rate) can be easily adjusted by moving the adjustment bar 31 to right and left. A time series data sequence set for learning is specified by a file path. In such a case, a file specified by the file path is read out. Information on the length and the number of time series data sequences may be stored in the file. In the screen in FIG. 5, it is specified that the length of feature waveforms is 5 and that the number of feature waveforms is 2.

The input setter 10 reads from the learning data storage 18, as input data for learning, the binary-labeled time series data sequence set for learning, the parameter information related to time series data sequences (the number of the time series data sequences, the length of the time series data sequences), the parameter information related to feature waveforms (the number and the length of the feature waveforms), the information on the performance indicator for the classification model (here, pAUC), and the information on the performance indicator parameter (here, a range of the false positive rate). The input setter 10 inputs the read data into the feature vector generator 11. Part or all of the input data for learning may be input by a user who is an operator or administrator of the apparatus, by using an input device. The input device is a device for inputting various data or instructions into the apparatus, such as a keyboard, a mouse, a tough panel, or a smartphone. In such a case, data received from the input device is input into the feature vector generator 11.

Here, a configuration is also possible in which the parameter information related to feature waveforms is not input into the feature vector generator 11. In such a case, the feature vector generator 11 may use default values for the number and the length of feature waveforms. For example, the number (maximum number) K of feature waveforms is 2, the length L of each feature waveform is "Q×0.1".

The input setter 10 initializes the feature waveform set S and the model parameter (weight vector) W. The weight vector W includes a weight on each feature waveform.

In the initialization of the weight vector W, for example, all K elements are set to 0.

The initialization of the feature waveform set S is performed as follows, for example. A window frame of the length L is shifted from a leading point of each time series data sequence at a constant interval, whereby partial waveforms (segments), each of the length L included in the window frame, are extracted. Clustering such as a k-means method is performed on the segments, whereby K clusters are generated. A centroid of each of the K clusters is calculated. The centroid is obtained by, for example, calculating an average of all segments belonging to a cluster. The K centroids calculated from the K clusters are set as the initialized feature waveform set S.

The initialization of the feature waveform set S may be performed using other methods. For example, a method is not excluded in which K feature waveforms of the length L are generated by using random numbers, and the feature waveforms are set as the feature waveform set S.

The feature vector generator 11 generates a K-dimensional feature vector for each time series data sequence. Specifically, for each of the time series data sequences as a target, distances between the target time series data sequence and the K feature waveforms are calculated as feature amounts. A K-dimensional feature vector storing the calculated K feature amounts (distances) in elements corresponding to the K feature waveforms is generated. The feature vector is a feature vector for learning. A feature vector generated based on a first time series data sequence (for example, a time series data sequence of the normal class) corresponds to a first feature vector, and a feature vector generated based on a second time series data sequence (for example, a time series data sequence of the anomalous class) corresponds to a second feature vector.

A feature vector for an i-th time series data sequence is denoted by "$X_i$". A k-th element of the feature vector $X_i$ (a distance to a k-th feature waveform) is "$X_{i,k}$" as defined by the above-mentioned equation (2). Accordingly, for example, assuming that the feature waveform set S includes feature waveforms 1, 2, . . . , K, and distances between the feature waveforms 1, 2, . . . , K and the time series data sequence i are "$X_{i,1}$", "$X_{i,2}$", . . . , "$X_{i,k}$", the feature vector $X_i=(X_{i,1}, X_{i,2}, \ldots, X_{i,k})$.

The update processor 12 updates the model parameter (weight vector) W for the classification model and the plurality of feature waveforms (feature waveform set S), based on the plurality of feature vectors generated for the plurality of time series data sequences, and on the performance indicator parameter. Hereinafter, the weight updater 13, the feature waveform updater 14, and the update termination determiner 15 included in the update processor 12 will be described.

The weight updater 13 performs learning of the model parameter (weight vector) for the classification model and learning of the feature waveform set at the same time through machine learning. Here, for the classification model, support vector machine (SVM) is used. SVM is an algorithm for learning a classification boundary to discriminate between "normal" and "anomalous" in a feature space, or a classification model for performing determination based on such a classification boundary. The feature space is a K-dimensional space with "$X_{i,k\ (k=1,2,\ldots,K)}$" on axes. When the number K of feature waveforms is 2, the feature space is a 2-dimensional space with "$X_{i,1}$" and "$X_{i,2}$" on axes. The model parameter (weight vector) corresponds to the classification boundary. The model parameter (weight vector) W includes parameters (weights) w1, w2, . . . , wk corresponding to the individual feature waveforms, respectively. The classification boundary is assumed to be linear, but may be nonlinear.

When the classification boundary is nonlinear, since the model parameter (weight vector) is an infinite-dimensional vector, a support vector set Sv and a set Sa of contribution rates of support vectors belonging to the set Sv are used instead, for the model parameter (weight vector) W corresponding to the classification boundary. The support vectors are feature vectors contributing to determination of the classification boundary. The contribution rate of a support vector represents how much the support vector contributes to the determination of the classification boundary. A support vector more greatly contributes to the determination as the contribution rate has a larger absolute value (when the contribution rate is 0, the support vector does not contribute to the determination of the classification boundary, and a corresponding feature vector is not a support vector). In SVM, a nonlinear classification boundary can be expressed by using a kernel (a function outputting an extended inner product), the support vectors, and the contribution rates of the support vectors.

In the present embodiment, learning of the model parameter (weight vector) through SVM is performed at the same time as learning of the feature waveform set. The learning of the model parameter and the learning of the feature waveform set are formulated as an optimization problem shown below.

[Expression 3]

$$Minimize_{W,S}: \max_{z \in Z_\beta, \pi \in \prod} H(X, z, \pi, W) \tag{3}$$

Subject to:

$$\|W\|_p \le \lambda \tag{4}$$

$$i_\beta^- = \lfloor \beta I^- \rfloor \tag{5}$$

$$z = \left\{X_{a_1}^-, X_{a_2}^-, \ldots, X_{a_{i_\beta^-}}^-\right\} \tag{6}$$

$$H(X, z, \pi, W) = \Delta_\beta(\pi^* - \pi) - W^T(\phi_z(X, \pi^*) - \phi_z(X, \pi)) \tag{7}$$

$$\phi_z(X, \pi) = \frac{1}{\beta I^+ I^-} \sum_{i^+=1}^{I^+} \sum_{i^-=1}^{i_\beta^-} (1 - \pi_{i^+,i^-})\left(X_{i^+}^+ - X_{a_{i^-}}^-\right) \tag{8}$$

$$\Delta_\beta(\pi^*, \pi) = \frac{1}{\beta I^+ I^-} \sum_{i^+=1}^{I^+} \sum_{i^-=1}^{i_\beta^-} \pi_{i^+,(i^-)_\pi} \tag{9}$$

$$X_{i,k} = \min_{j=1,\ldots,Q-L+1} \frac{1}{L} \sum_{l=1}^{L} (T_{i,j+l-1} - S_{k,l})^2 \tag{10}$$

$$X_i = (X_{i,1}, X_{i,2}, \cdots X_{i,k}) \tag{11}$$

In the above optimization problem, "$X^+$" represents a set of feature vectors each having a positive label. "$X^-$" represents a set of feature vectors each having a negative label. A feature vector having a positive label is referred to as a normal feature vector, and a feature vector having a negative label is referred to as an anomalous feature vector in some cases.

The expression (3) defines that the model parameter (weight vector) W and the feature waveform set S are obtained by minimizing a maximum value of a function H(X, z, π, W), subject to a constraint.

"β" is an upper limit value of the range of the false positive rate for pAUC designated as the performance indicator parameter. For example, "β" is 0.1 when it is specified that the range of the false positive rate is not smaller than 0 and not larger than 0.1.

"$I^+$" represents the number of positive-labeled time series data sequences (positive examples) in the time series data sequence set. "$I^-$" represents the number of negative-labeled time series data sequences (negative examples) in the time series data sequence set. Since the number of all time series data sequences is "I" as mentioned above, $I=I^++I^-$.

"$z_\beta$" represents a partial set of anomalous feature vectors when $i_\beta^-$ (at least one) feature vectors are extracted from a set of feature vectors of the negative examples (anomalous feature vectors). "$i_\beta^-$" is defined by the equation (5), and is a resultant value of calculation of a floor function taking "$\beta I^-$" as an argument.

$$\lfloor \ \rfloor$$

is a floor function and outputs a largest integer equal to or smaller than an argument that is a real number. For example, when the argument is 4.65, an output of the floor function is 4. Note that when an integer cannot be derived from "$\beta I^-$", or when a lower limit value of the range of the false positive rate is any other value than 0, strict formulation may be achieved by a method similar to a method according to a document (A Structural SVM Based Approach for Optimizing Partial AUC, JMLR2013).

"z", as defined by the equation (6), defines that the selected $i_\beta^-$ anomalous feature vectors are stored in descending order of scores. Subscripts a1, a2, . . . of "$X^-$" represent indexes. A score is an output value of the classification model, and is an inner product of the model parameter (weight vector) and a feature vector, which will be described later. Assuming that an output value of the classification model is "Y", the classification model can be expressed as $Y=W^T \cdot X$. In the present embodiment, a larger score means higher probability of a positive label. However, modification may be made such that a smaller score indicates higher probability of a positive label.

"Π" in the expression (3) represents a set of ordering matrix based on $I^+$ positive examples and $i_\beta^-$ negative examples selected from the time series data sequence set. An ordering matrix is a matrix with $I^+$ rows and $i_\beta^-$ columns. In an ordering matrix, a value corresponding to a magnitude relationship between a score of a positive example and a score of a negative example is stored in an element corresponding to a pair of the positive example and the negative example, which is one of pairs created by pairing the $I^+$ positive examples and the $i_\beta^-$ negative examples one by one (totaling $(I^+ \times i_\beta^-)$ pairs). When a score of a positive example is not smaller than a score of a negative example, the value of a corresponding element is "0", and when a score of a positive example is smaller than a score of a negative example, the value of an element corresponding to the pair is "1". In other words, for each pair, when a negative example has a score indicating higher probability of a positive label than a positive example, "1" is stored, and otherwise "0" is stored. In other words, when a magnitude relationship between scores is reverse to an intrinsic relationship, "1" is stored, and otherwise "0" is stored.

"π" is an ordering matrix as described above and belongs to "Π".

The expression (4) defines that an Lp norm is not larger than "λ" (Lp norm regularization). "λ" is a hyperparameter and is given beforehand. "p" represents a degree of the norm. When p=1, an L1 norm is indicated, and when p=2, an L2 norm is indicated.

When p=1, $\|W\|_1=|w_1|+|w_2|+ \ldots +|w_k|$. When p=2, $\|W\|_2=|w_1|^2+|w_2|^2+ \ldots +|w_k|^2$.

A value of "p" is predetermined. In the present embodiment, for example, p=2 (L2 norm), supposing that as many feature waveforms as the number of feature waveforms specified by the parameter information are leant. By setting "p" as p=2, the number of feature waveforms to be learnt is likely to become a specified number (any of weights w1, w2, . . . , wk are unlikely to become zero). In a second embodiment described later, a large number is specified by the parameter information based on sparse modeling, and the number of feature waveforms to be learnt is narrowed down to a smaller number of feature waveforms than the specified number, and therefore "p" is set as p=1 (L1 norm). In such a case, many w among w1, w2, . . . , wk become zero, and consequently the number of feature waveforms to be leant is reduced. However, regardless of such values, a value of "p" can be determined arbitrarily. "p" may be 3 or a large number.

The equation (7) defines an objective function H(X, z, π, W). The feature vector X, the weight vector W, z, and π are included as variables.

"$\Delta_\beta(\pi^*, \pi)$" included in the objective function H is defined by the equation (9). "$\Delta_\beta(\pi^*, \pi)$" represents a ratio of the number of "1"s included in a matrix π (an error rate) calculated by adding up all elements included in the matrix π and dividing a resultant sum by "$I^+ \times \beta I^-$" that is the number of the elements of the matrix π. "$i^+$" and "$i^-$" in the subscript of π represent a row and a column, respectively. "$\pi^*$" is a matrix of the same size as the above-mentioned ordering matrix π and is a matrix in which all elements are zero (0).

"$\phi_z(X, \pi)$" included in the objective function H is defined by the equation (8). "$\phi_z(X, \pi^*)$" may be obtained by replacing "π" in the equation (8) with "$\pi^*$". A resultant of "$\phi_z(X, \pi^*)-\phi_z(X, \pi)$" is that components corresponding to "0" elements in "π" become zero, and components corresponding to "1" elements in "π" become basically non-zero (when $\pi=\pi^*$, "$\phi_z(X, \pi^*)-\phi_z(X, \pi)$" is a zero vector). Accordingly, with respective feature vectors $$X_{i^+}^+$$

and $$X_{a_{i_-}}^-$$

of positive examples and negative examples corresponding to "0" elements in "π", $$W^T \cdot (X_{i^+}^+ - X_{a_{i_-}}^-)$$

becomes large (that is, the feature vectors are properly weighted).

The equation (10) defines a distance between a time series data sequence i and a feature waveform k, as mentioned earlier. The equation (11) defines a feature vector of a time series data sequence i, as mentioned earlier.

The optimization problem as described above can be efficiently calculated by using a stochastic gradient method.

Thus, the weight vector W and the feature waveform set S can be efficiently calculated. More specifically, the weight updater 13 updates the weight vector W based on the stochastic gradient method. Subsequently, the feature waveform updater 14 updates the feature waveform set S based on the stochastic gradient method. The processing by the feature vector generator 11, the weight updater 13, and the feature waveform updater 14 is iterated, whereby the weight vector W and the feature waveform set S are learnt. Although the stochastic gradient method is used here, any other type of gradient method such as a steepest descent method may be used. Hereinafter, the weight updater 13 and the feature waveform updater 14 will be described in detail.

The weight updater 13 updates the model parameter (weight vector) W based on a projected gradient descent method (an example of the stochastic gradient method). Specifically, the objective function H(X, z, π, W) is partially differentiated by the model parameter (weight vector) W. At the time, "z" and "π" applying to "max" of the expression (3) are found. As mentioned above, "z" is $i_\beta^-$ anomalous feature vectors selected in descending order of scores. "π" may be identified based on "z" and a normal feature vector, which will be described later. The identified "z" and "π" are substituted into the objective function H(X, z, π, W), which is then differentiated directly by "W", whereby a value of a gradient ∂H/∂W is calculated. The weight updater 13 updates the weight vector W based on the calculated value (partial derivative).

For example, the partial derivative (a vector in the same dimensions as "W") is subtracted from the weight vector W. In other words, the value of "W" is moved in an opposite direction to the partial derivative. Thus, the value of "H" becomes smaller. Although the partial derivative is subtracted here, the partial derivative multiplied by a certain coefficient may be subtracted. It is determined whether or not decreased "W" satisfies the above-mentioned constraint of regularization (the expression (4)). When the constraint of regularization is satisfied, decreased "W" is set as updated "W". When decreased "W" does not satisfy the constraint of regularization, the value of decreased "W" is projected onto an L2 ball in a direction to an origin (that is, a direction in which a Euclidean distance to the L2 ball is made smallest), and a value of a point projected onto the L2 ball is set as updated "W". The L2 ball is a graph representing distances (Euclidean distances) of the L2 norm. The L2 ball here is a ball with a radius λ. The L2 ball indicates a possible range of values of "W". As an example, "λ" is 1. However, "λ" may be larger than 1, or may be smaller than 1.

Figure 6:
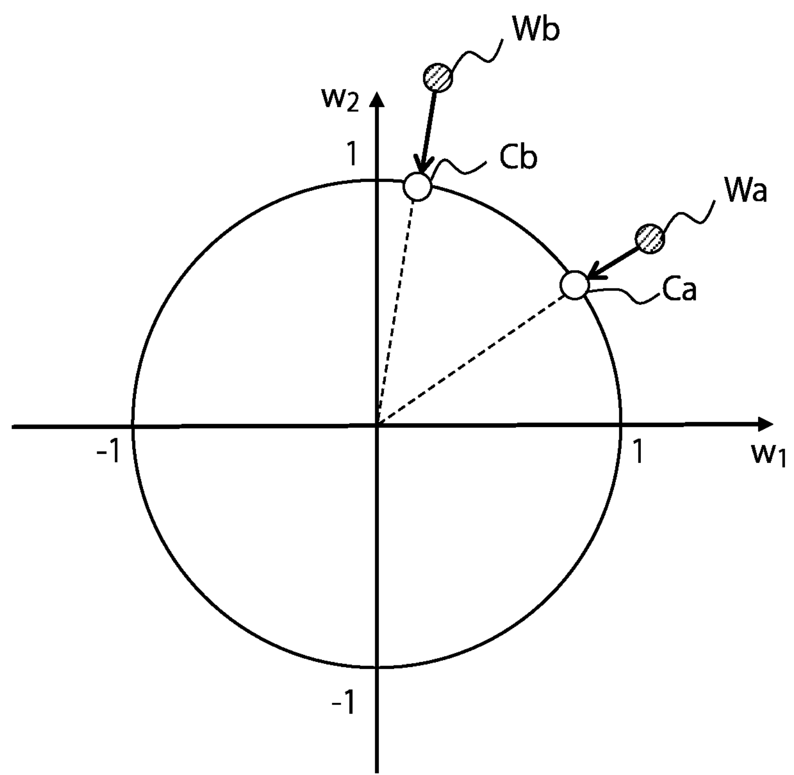
FIG. 6 shows an example in which a weight vector is projected onto an L2 ball.

FIG. 6 shows an example in which values of the weight vector are projected onto the L2 ball when "λ" is 1. The L2 ball is a circle with a radius of 1. A decreased weight vector Wa is located outside of the L2 ball. In other words, the decreased weight vector Wa does not satisfy the constraint of regularization. A straight line connecting the location of the weight vector Wa and the origin is calculated. An intersection Ca of the calculated straight line and the L2 ball is calculated. A value of the intersection Ca is set as updated "W". In a case of a decreased weight vector Wb, similarly, a straight line connecting a location of the weight vector Wb and the origin is calculated. An intersection Cb of the calculated straight line and the L2 ball is calculated. A value of the intersection Cb is set as updated "W".

In the above-described optimization problem, a part that depends on the feature vector X or the feature waveform set S does not depend on the model parameter (weight vector) W. For example, the equation (10) does not depend on "W".

The feature waveform updater 14 updates the feature waveform set S based on a stochastic gradient descent method (an example of the stochastic gradient method).

Figure 7:
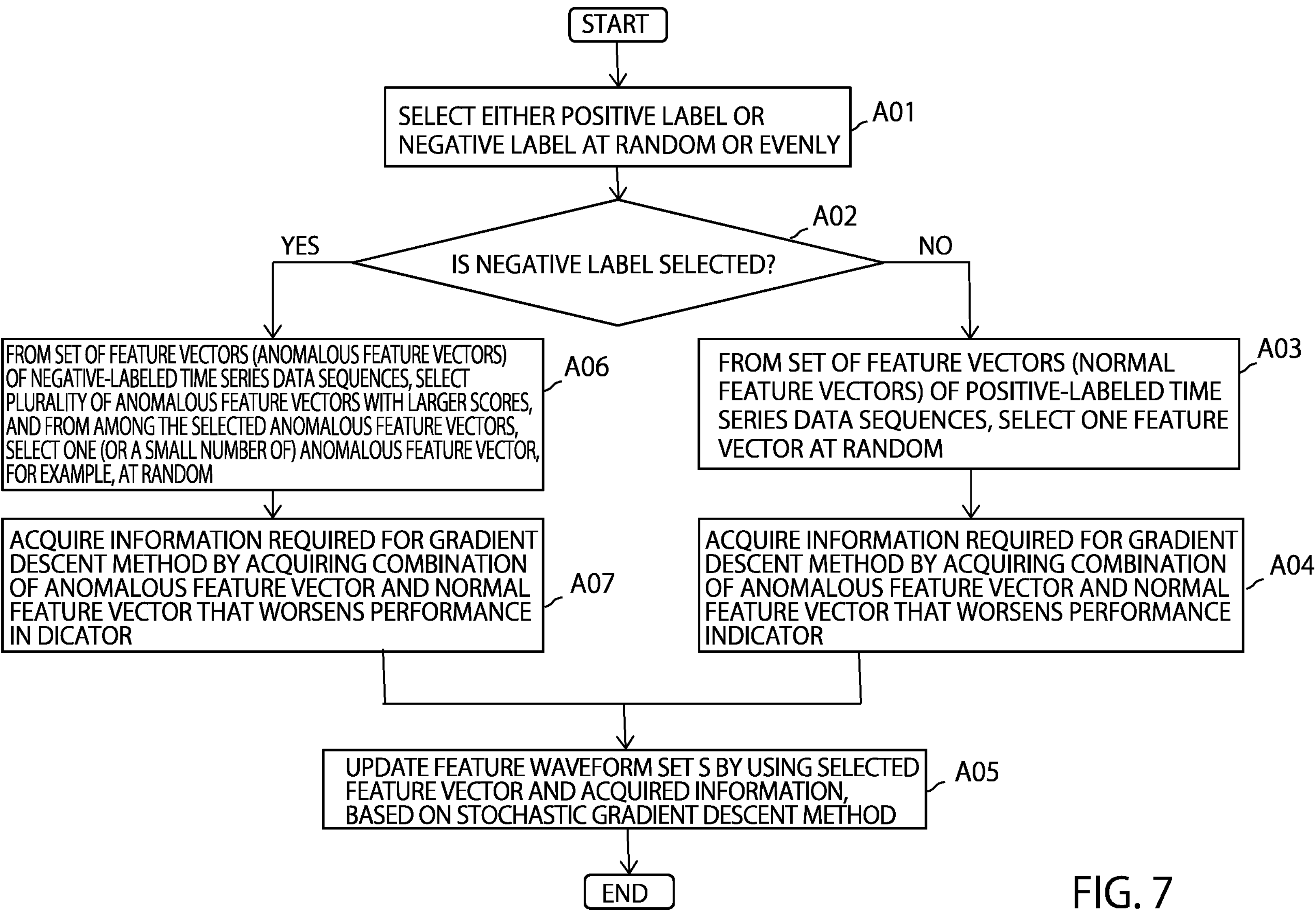
FIG. 7 is a flowchart showing an example of operation of a feature waveform updater.

FIG. 7 is a flowchart showing an example of operation of the feature waveform updater 14. First, any one of a positive label and a negative label is selected at random (A01). By being selected at random, positive labels and negative labels are selected evenly (with equal probabilities). Any other method may be used, such as alternately selecting a positive label and a negative label, not at random.

It is determined which one of a positive label and a negative label the selected label is (A02).

When a positive label is selected, one normal feature vector is selected at random from a set of the feature vectors (normal feature vectors) of the positive-labeled time series data sequences (A03). The normal feature vectors correspond to the first feature vectors, as an example.

A score of a time series data sequence corresponding to the selected normal feature vector is calculated. A time series data sequence corresponding to a normal feature vector is a time series data sequence based on which the normal feature vector is generated. Moreover, a score of a time series data sequence corresponding to each anomalous feature vector in a set of the feature vectors (anomalous feature vectors) of negative-labeled time series data sequences is calculated (A04). A time series data sequence corresponding to an anomalous feature vector is a time series data sequence based on which the anomalous feature vector is generated. The anomalous feature vectors correspond to the second feature vectors, as an example.

Hereinafter, a score of a time series data sequence corresponding to a normal feature vector will simply be referred to as a normal feature vector score, and a score of a time series data sequence corresponding to an anomalous feature vector will simply be referred to as anomalous feature vector score.

The score is calculated as an inner product of the model parameter (weight vector) most recently updated by the weight updater 13 and a feature vector. As an example, when the weight vector W is $(w_1, w_2)$ and a feature vector Xi of a time series data sequence i is $(X_{i,1}, X_{i,2})$, the score is $W^T \cdot Xi = w_1 X_{i,1}, + w_2 X_{i,2}$. Note that "T" means "transpose".

The score corresponds to an output value (prediction value) of the classification model to determine whether a time series data sequence is classified as a positive example (normal time series data sequence) or as a negative example (anomalous time series data sequence). Here, a larger score means higher probability that the time series data sequence is normal. However, scores may be configured such that a smaller score means higher probability that the time series data sequence is normal.

The normal feature vector selected in step A03 is set as a target feature vector (A04). Moreover, "z" and "π" applying to "max" of the expression (3) are found (A04). Applicable "z" is iβ-anomalous feature vectors extracted from the anomalous feature vectors Xi in descending order of values of "WT·Xi". To find applicable "x", a combination of an anomalous feature vector and a normal feature vector resulting in a larger anomalous feature vector score than a normal feature vector score is found. Such a combination is a combination of an anomalous feature vector and a normal feature vector that worsens the performance indicator. In other words, an anomalous feature vector score is found that indicates higher probability of belonging to the normal class than a normal feature vector score. Applicable "T" is found based on such combinations. In other words, among a plurality of patterns of assigning each anomalous feature vector to each column of "π", a pattern satisfying "max" is found, and "π" is identified based on the found pattern. Details of the scheme is described in Algorithm 1 (Find Most-Violated Constraint) in a document (A Structural SVM Based Approach for Optimizing Partial AUC, JMLR2013) (A04).

As described above, in the present step, one combination of "z" and "π" applying to "max" of the expression (3), which is information required for the gradient descent method, is found.

The feature waveform set S is updated by using the selected target feature vector and "z" and "π" applying to "max", based on the stochastic gradient descent method (A05).

Specifically, a gradient ∂H/∂S, which is obtained by partially differentiating the objective function H(X, z, π, W) by the feature waveform set S, is calculated. An example of the calculation will be shown. Using a chain rule in the differential equation, "∂H/∂S" can be transformed as follows. "Xi" is a variable representing a target feature vector.

$$\partial H/\partial S=\partial H/\partial Xi\cdot\partial Xi/\partial S \quad (12)$$

An expression "∂H/∂Xi" is derived based on "z" and "π", the target feature vector is input into the variable "Xi" in the equation, and a value of the updated weight vector W is input into the variable "W" in the equation, whereby a value of "∂H/∂Xi" is calculated. Moreover, a value of "∂Xi/∂S" is calculated by inputting the current feature waveforms (initial feature waveforms or previously updated feature waveforms) into the variable "S" in the expression "∂Xi/∂S". Note that the expression "∂Xi/∂S" may be derived from the equation (10). A value of "∂H/∂S" (partial derivative) is calculated by multiplying the value of "∂H/∂Xi" by the value of "∂Xi/∂S".

The feature waveform set S is updated based on the value of "∂H/∂S" (partial derivative). For example, the value of "∂H/∂S" is subtracted from the feature waveform set S. In other words, values in "S" are moved in an opposite direction to the partial derivative (moved in a direction in which the value of "H" becomes smaller). Although the partial derivative is subtracted here, the partial derivative multiplied by a coefficient may be subtracted. Thus, the updated feature waveform set S is obtained. Such subtraction corresponds to updating the feature waveform set S such that the above-mentioned magnitude relationship between scores is corrected.

When it is determined in step A02 that a negative label is selected, one anomalous feature vector affecting pAUC is selected from the feature vectors (anomalous feature vectors) of the negative-labeled time series data sequences (A06). Specifically, first, each anomalous feature vector score is calculated. The score is calculated as an inner product of the model parameter (weight vector) most recently updated by the weight updater 13 and an anomalous feature vector. The anomalous feature vectors are sorted in descending order of scores (however, the anomalous feature vectors may be sorted in ascending order of scores). U (U is an integer not smaller than 1) anomalous feature vectors are identified in descending order of scores. U is a value determined depending on the performance indicator parameter and is, as an example, "β×I". Among the U anomalous feature vectors, one anomalous feature vector is selected. For example, an anomalous feature vector may be selected at random, or an anomalous feature vector making a largest score may be selected, or an anomalous feature vector may be selected by any other method. Although one anomalous feature vector is selected here, a small number (predetermined number), but not smaller than two, of anomalous feature vectors may be selected. Although U anomalous feature vectors are selected in descending order of scores here, anomalous feature vectors making scores not smaller than a threshold value may be selected. The threshold value may be predetermined, or may be determined arbitrarily.

An anomalous feature vector making a large score can be said to be a feature vector having high probability of resulting in false positive. In other words, such a feature vector is a feature vector that affects the range of the false positive rate designated as the parameter information, that is, a feature vector that affects pAUC. By selecting such a feature vector, it is possible to efficiently learn feature waveforms fitting the false positive rate condition that pAUC is maximized within a specified range of the false positive rate.

For the range (β) of the false positive rate, a small range is specified in general, as an example, a range not larger than 0.05 or 0.01. Accordingly, when an anomalous feature vector is selected simply from among all anomalous feature vectors, anomalous feature vectors affecting the range of the false positive rate are scarcely selected, and consequently, it is difficult to learn feature waveforms fitting the condition that pAUC is optimized (maximized) within the range of the false positive rate. Accordingly, in step A06, feature vectors (anomalous feature vectors) of time series data sequences affecting the range of the false positive rate are identified based on scores, and among such anomalous feature vectors, one anomalous feature vector (or a small number of anomalous feature vectors) is selected. The selected feature vector is set as a target feature vector.

The anomalous feature vector selected in step A06 is set as a target feature vector (A07). "z" and "π" applying to "max" of the expression (3) are found (A07). Applicable "z" is iβ-anomalous feature vectors extracted from the anomalous feature vectors Xi in descending order of values of "WT·Xi". To find applicable "π", a combination of an anomalous feature vector and a normal feature vector resulting in a larger anomalous feature vector score than a normal feature vector score is found. Such a combination is a combination of an anomalous feature vector and a normal feature vector that worsens the performance indicator. In other words, a normal feature vector score is found that indicates lower probability of belonging to the normal class than a score made by the target feature vector. Applicable "π" is found based on such combinations through a method similar to step A04 described above (see Algorithm 1 (Find Most-Violated Constraint) in the document (A Structural SVM Based Approach for Optimizing Partial AUC, JMLR2013)).

As described above, in the present step, one combination of "z" and "π" applying to "max" of the expression (3), which is information required for the gradient descent method, is found.

The feature waveform set S is updated by using the selected target feature vector and "z" and "π" applying to "max", based on the stochastic gradient descent method (A05). Details of step A05 are described above and therefore omitted.

The update termination determiner 15 determines whether or not to terminate updates of the model parameter (weight vector) W and the feature waveform set S. Specifically, it is determined whether or not an update termination condition is satisfied. The update termination condition is defined by, for example, the number of iterations of the series of processing by the feature vector generator 11, the weight updater 13, and the feature waveform updater 14. For example, it is determined whether or not the number of iterations reaches a predetermined number (10000 iterations or the like). When the predetermined number is reached, it is determined that the learning of the weight vector W and the feature waveform set S is sufficiently performed, and the processing is terminated. When the predetermined number is not reached, the series of processing is iterated until the predetermined number is reached. By using the number of updates to define the update termination condition, time required for learning can be set within a desired range.

The update termination determiner 15 may determine a threshold value for prediction (for determination) from a result of the learning. For example, the threshold value may be determined such that the false positive rate becomes equal to or lower than a certain value. Alternatively, the threshold value may be predetermined.

The output information storage 20 internally stores data on the feature waveform set S and data on the weight vector W acquired through the learning.

The display 17 displays resultant data of learning including the feature waveform set S and the weight vector W acquired through the learning in a screen.

Figures 8A, 8B:
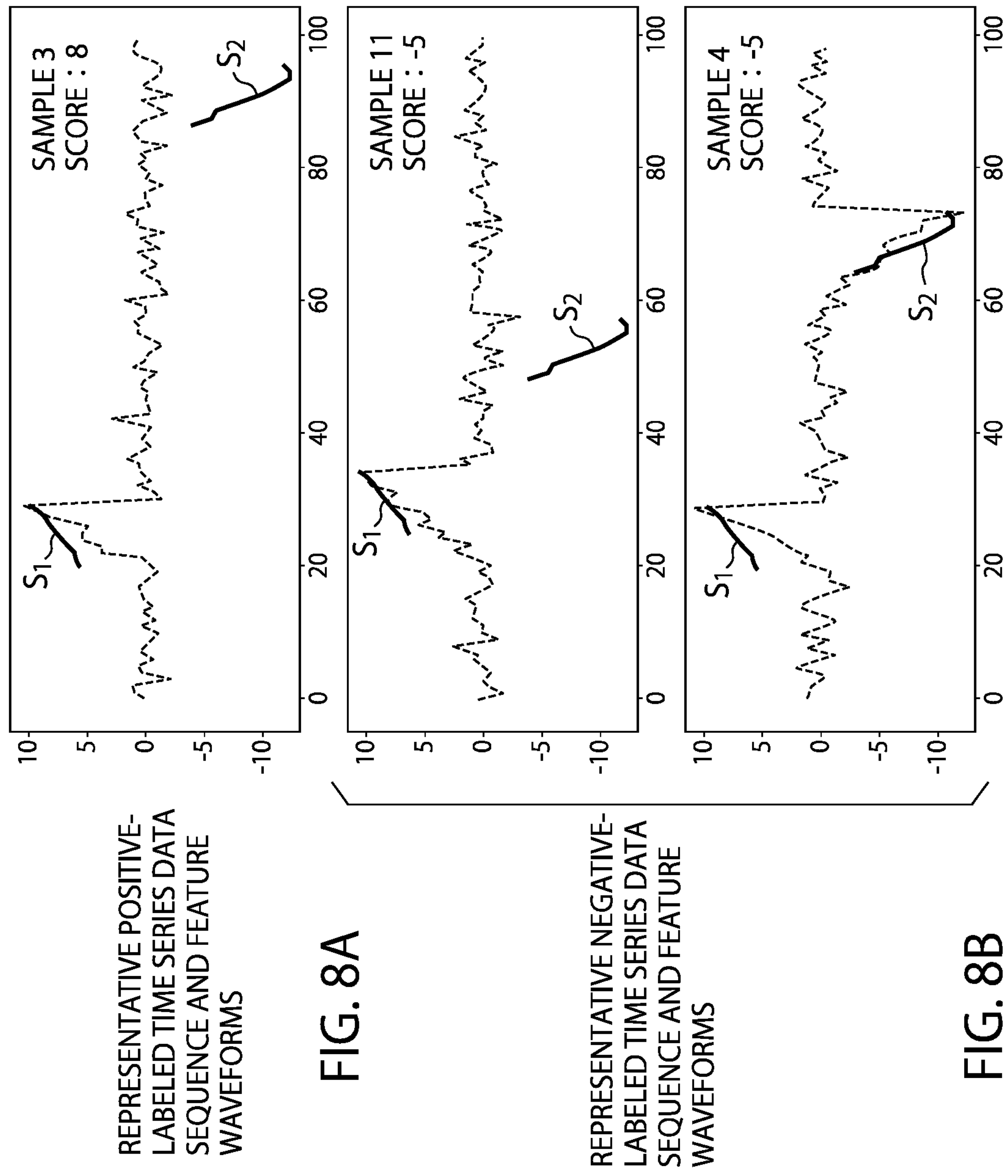
FIGS. 8A and 8B show an example of resultant data of learning displayed on a display.

FIGS. 8A and 8B shows an example of the resultant data of learning displayed on the display 17. In FIG. 8A, a positive-labeled time series data sequence (sample 3) for learning and two leant feature waveforms (denoted by $S_1$, $S_2$, respectively) are displayed. The feature waveforms $S_1$, $S_2$ are feature waveforms each effective in detecting anomaly (a negative label). Here, an example is shown in which learning is performed under the conditions shown in FIG. 5 (the upper limit value (β) of the range of the false positive rate is 0.01). A horizontal axis represents time, and a vertical axis represents amplitude. The sample 3 is a third time series data sequence of all time series data sequences for learning. A score calculated from the time series data sequence (sample 3), the feature waveforms $S_1$, $S_2$, and the learnt weight vector W is 8. The value of 8 is not smaller than the threshold value, and the sample 3 is correctly classified. Graphs of the feature waveforms $S_1$, $S_2$ are placed at locations closest in distance to the sample 3, respectively. Even at the locations closest in distance to the sample 3, the feature waveforms $S_1$, $S_2$ are far from the sample 3. In other words, the feature waveforms $S_1$, $S_2$ do not fit the sample 3. Information indicating "normal" may be displayed. Such information and the score are examples of score-based information. Although the sample 3 is displayed here, another time series data sequence may be displayed similarly.

In FIG. 8B, negative-labeled time series data sequences (samples 11, 4) for learning and the learnt feature waveform $S_1$ and the learnt feature waveform $S_2$ are displayed. The feature waveform $S_1$ and the feature waveform $S_2$ are the same as the feature waveforms shown in FIG. 8A. A score calculated from the time series data sequence (sample 11), the feature waveforms $S_1$, $S_2$, and the learnt weight vector W is −5. The value of −5 is smaller than the threshold value, and the sample 11 is correctly classified. Similarly, a score calculated from the time series data sequence (sample 4), the feature waveforms $S_1$, $S_2$, and the learnt weight vector W is also −5. The value of −5 is smaller than the threshold value, and the sample 4 is also correctly classified. For the samples 11, 4, information indicating "anomalous" may be displayed. Such information and the score are examples of the score-based information.

The graphs of the feature waveforms $S_1$, $S_2$ are placed at locations closest in distance to the sample 11, respectively. While the feature waveform $S_2$ does not fit the sample 11 (is far from the sample 11), the feature waveform $S_1$ fits a partial waveform of the sample 11 (is close to the sample 11). The feature waveform $S_1$ is effective in detecting the fitted partial waveform as a shape specific to anomaly.

The graphs of the feature waveforms $S_1$, $S_2$ are placed at locations closest in distance to the sample 4, respectively. While the feature waveform $S_1$ does not fit the sample 4, the feature waveform $S_2$ fits a partial waveform of the sample 4. The feature waveform $S_2$ is effective in detecting the fitted partial waveform as a shape specific to anomaly. Even when a small number of time series data sequences has such a shape in the negative-labeled time series data sequence set for learning (for example, even when many of the negative-labeled time series data sequences have partial waveforms similar to the partial waveform fitted by the feature waveform $S_1$ in the sample 11), such time series data sequences can effectively be detected as ones to be classified as negative label.

Figure 9:
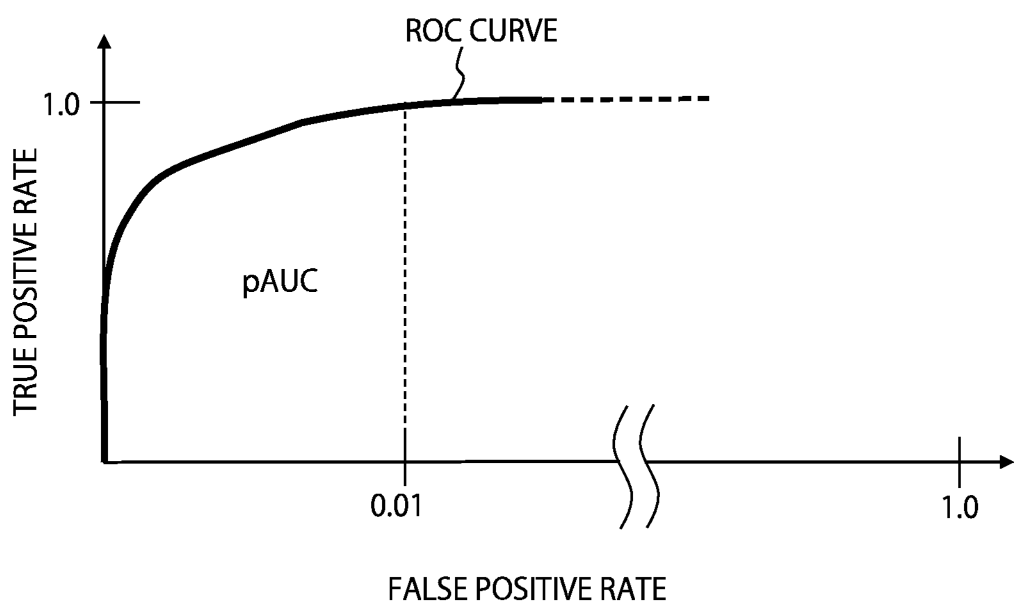
FIG. 9 shows an example of a ROC curve.

FIG. 9 shows an example of the ROC curve created based on a result of prediction (determination) of a positive label or a negative label performed, by using the learnt feature waveforms $S_1$, $S_2$ and the learnt model parameter (weight vector) W, on the time series data sequences used in learning. The determination is performed by calculating a score of each time series data sequence and comparing the score with the threshold value. A time series data sequence is classified as positive label when the score is not smaller than the threshold value, and is classified as negative label when the score is smaller than the threshold value. An area of a part confined under the ROC curve within a range of the false positive rate not smaller than 0 and not larger than 0.01 is pAUC. pAUC is large. Accordingly, even in the range of the false positive rate not larger than 0.01, it is possible to determine "normal" or "anomalous" for a time series data sequence with high accuracy.

Although the upper limit value (β) of the range of the false positive rate is 0.01 in FIG. 8, a description will be given below of an example in which learning is performed when "β" is set at 1.0, using FIGS. 10 and 11.

Figure 10:
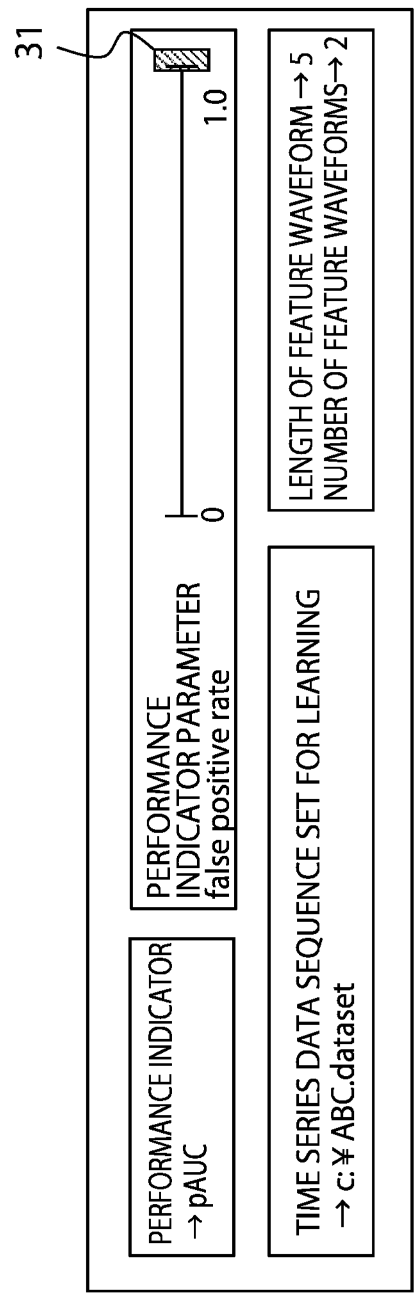
FIG. 10 shows an example of a GUI screen.

FIG. 10 shows an example of a GUI screen in the present case. A user changes the range of the performance indicator parameter via a GUI by operating the adjustment bar 31 (user input information) and sets the performance indicator parameter at a maximum value of 1.0. Other conditions are identical to the conditions shown in FIG. 5. Learning is performed within the changed range of the false positive rate (that is, learning is performed such that AUC is maximized). By changing the performance indicator parameter as described above, feature waveforms and the weight vector W to be learnt are changed, and calculated scores, determined labels, and prediction performance in the range (β) of the false positive rate are also changed. An example of resultant data of learning acquired as a result of learning performed within the changed range of the false positive rate will be described using FIG. 11.

Figure 11A:
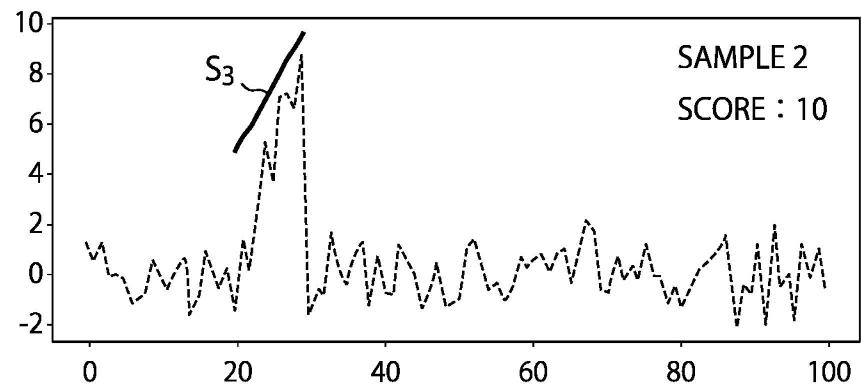
FIGS. 11A and 11B show display examples of a time series data sequence for learning and a learnt feature waveform.

In FIG. 11A, a positive-labeled time series data sequence (sample 2) for learning and a learnt feature waveform (denoted by $S_3$) are displayed. Only one feature waveform is learnt (which is a case where other feature waveforms are not output because weights on the other feature waveforms become 0 through processing by the weight update processor). A score calculated from the time series data sequence (sample 2), the feature waveform $S_3$, and the learnt weight vector W is 10. The value of 10 is not smaller than the threshold value, and the sample 2 is correctly classified. A graph of the feature waveform $S_3$ is placed at a location closest in distance to the sample 2. Even at the location closest in distance to the sample 2, the feature waveform $S_3$ is far from the sample 2. In other words, the feature waveform $S_3$ does not fit the sample 2.

Figure 11B:
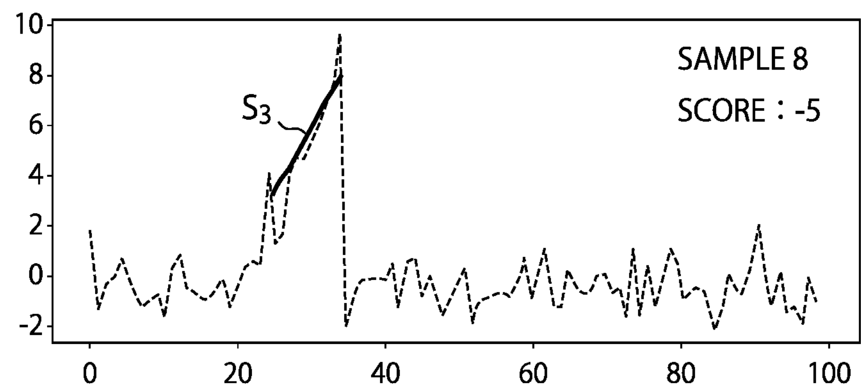

In FIG. 11B, a negative-labeled time series data sequence (sample 8) for learning and the learnt feature waveform $S_3$ are displayed. The feature waveform $S_3$ is the same as the feature waveform shown in FIG. 11A. A score calculated from the time series data sequence (sample 8), the feature waveform $S_3$, and the learnt weight vector W is −5. The value of −5 is smaller than the threshold value, and the sample 8 is correctly classified.

Figure 12:
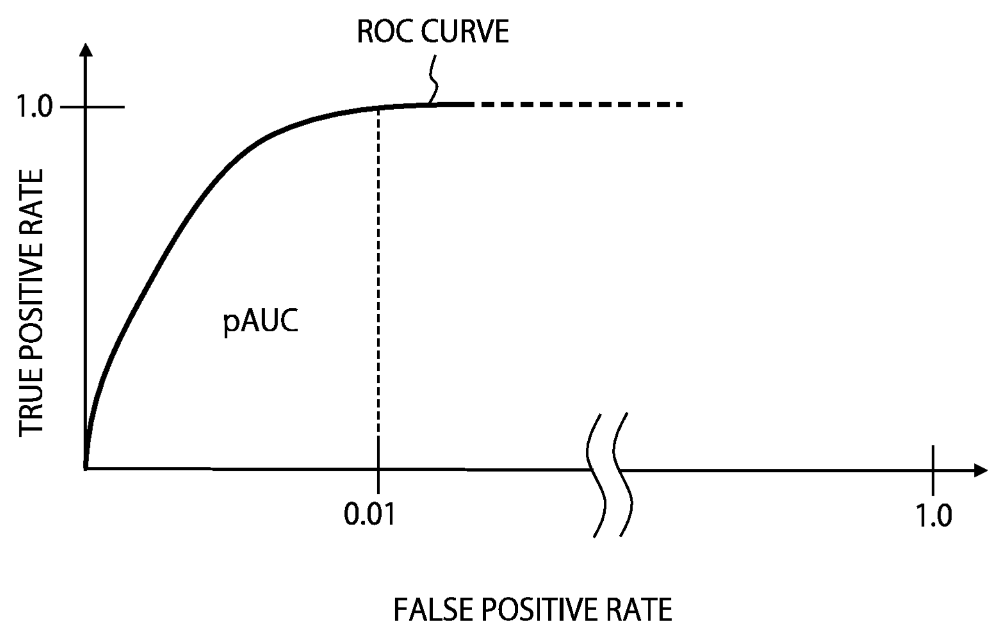
FIG. 12 shows an example of a ROC curve.

FIG. 12 shows an example of the ROC curve created based on a result of determination of a positive label or a negative label performed, by using the learnt feature waveform $S_3$ and the learnt weight vector W, on the time series data sequences used in learning. It can be seen that an area of a part confined under the ROC curve within a range of the false positive rate not smaller than 0 and not larger than 0.01 (pAUC) is smaller than pAUC shown in FIG. 9.

In other words, as a result of performing learning such that AUC (not pAUC) is optimized (maximized) when β=1.0, feature waveforms effective in detecting a less-frequently occurring shape as anomaly, like the feature waveform $S_2$ shown in FIG. 8, cannot be learnt. Accordingly, time series data sequences having such a shape cannot be detected as anomaly. Hence, by performing learning such that pAUC is optimized within a range specified by using a small value of "β" as shown in FIG. 9, it is possible to learn feature waveforms and the weight vector W that can detect even anomaly in a less-frequently occurring shape. Since the ROC curve is a monotonically increasing function, AUC becomes also large in comparison with AUC shown in FIG. 12 as a result of optimizing pAUC. Accordingly, the classification model (weight vector W) learnt when the range is specified by using a small value of "β" as shown in FIG. 9 demonstrates higher prediction performance as a whole. Nonetheless, even when β=1.0, the feature waveform $S_3$ effective in detecting anomaly can be learnt, and accordingly the present embodiment in such a case is also effective in learning for anomaly detection.

Figures 13A, 13B:
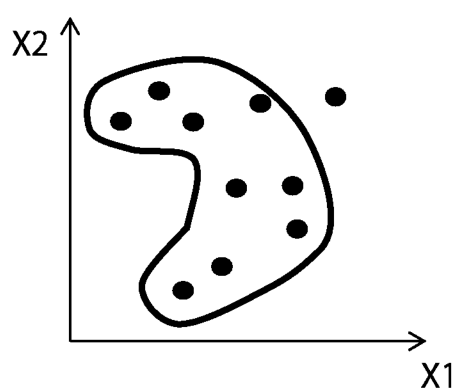
FIGS. 13A and 13B schematically show classification boundaries represented by learnt model parameters (weight vectors)

FIG. 13 schematically shows classification boundaries indicated by learnt model parameters (weight vectors). FIG. 13A shows an example of a linear classification boundary, and FIG. 13B shows an example of a nonlinear classification boundary. In any of the examples, a feature space is 2-dimensional. As shown in FIG. 13A, in a case of the linear classification boundary, the classification boundary is represented by a straight line. In the example, a region above the straight line is a normal region (upper side), and a region below the straight line is an anomalous region. Black circles represent feature vectors. As shown in FIG. 13B, in a case of the nonlinear classification boundary, the classification boundary has a complicated shape. In the example, an inside of the classification boundary is a normal region, and an outside of the classification boundary is an anomalous region.

Figure 14:
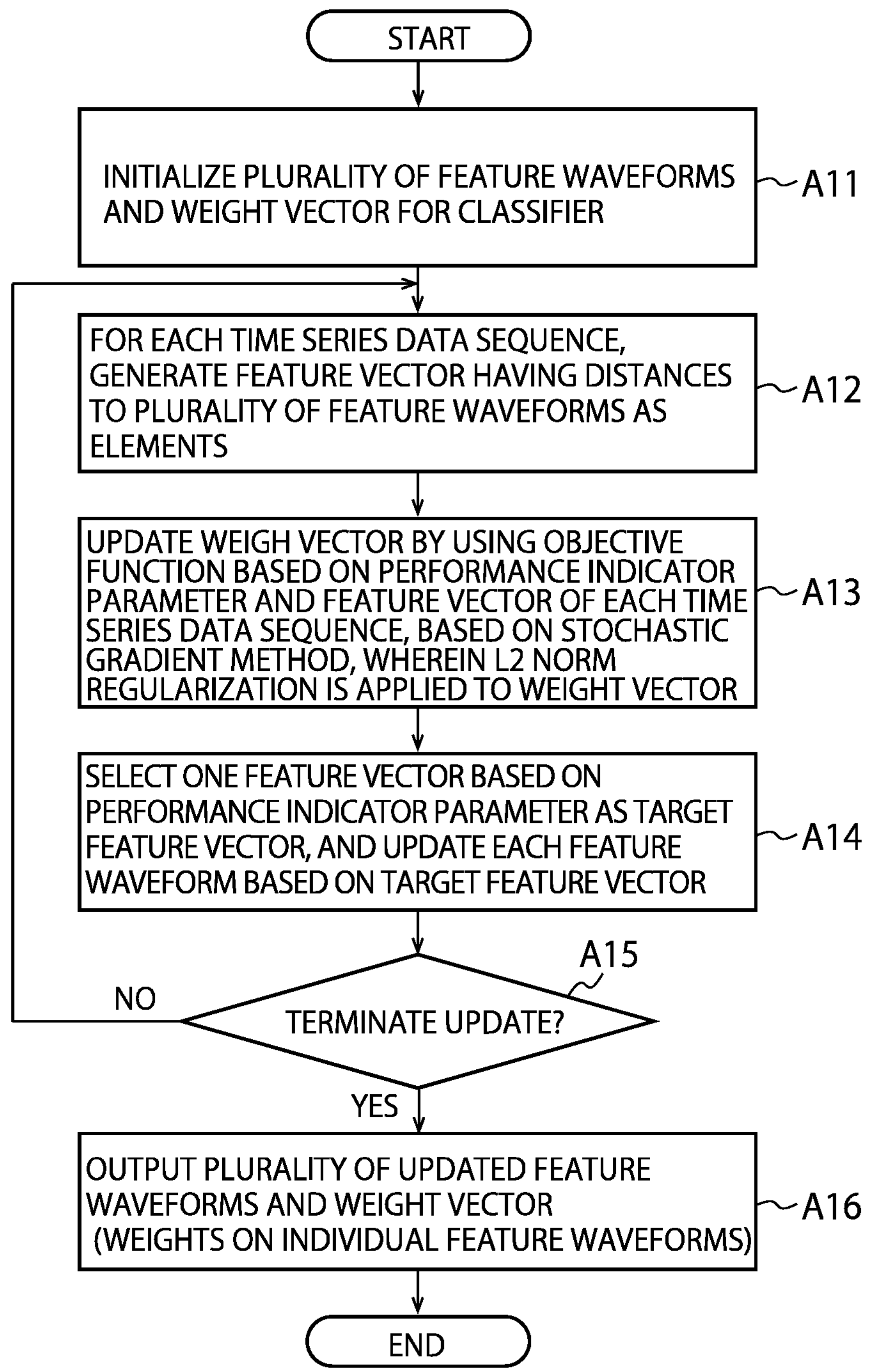
FIG. 14 is a flowchart of operation in a learning phase.

FIG. 14 is a flowchart of operation in the learning phase.

In step A11, the input setter 10 initializes a plurality of feature waveforms (a feature waveform set) and the weight vector W for a classification model. The classification model is also referred to as a classifier or a predictor.

In step A12, for each time series data sequence for learning, the feature vector generator 11 calculates distances to the plurality of feature waveforms and generates a feature vector including the calculated plurality of distances as elements.

In step A13, the weight updater 13 updates the weight vector W by using the objective function H (see the expression (3)) based on a performance indicator parameter and using the respective feature vectors of the time series data sequences, based on the stochastic gradient method. Specifically, a partial derivative (a gradient of "W") is calculated by inputting each feature vector in the variable X in a resultant expression obtained by partially differentiating the objective function by "W" (δH/δW). The partial derivative, or the partial derivative multiplied by a coefficient, is subtracted from the current weight vector W. It is determined whether or not the decreased weight vector satisfies the constraint of L2 norm regularization (see the expression (4)). When the constraint is not satisfied, the weight vector is updated by projecting the weight vector onto the L2 ball (see FIG. 6). When the constraint of L2 norm regularization is satisfied, the decreased weight vector is set as the updated weight vector.

In step A14, based on the performance indicator parameter, the feature waveform updater 14 selects, for example, one time series data sequence i as a target feature vector Xi. Each feature waveform is updated based on the selected target feature vector Xi. For example, the objective function H is partially differentiated by the feature waveform set S (δH/δS), and the resultant expression is transformed into "δH/δXi·δXi/δS". "δH/δS" (a gradient of "S") is calculated by calculating each value of "δH/δXi" and "δXi/δS" and multiplying the calculated values. The feature waveform set S is updated by subtracting a value of the gradient of "S" from the feature waveform set S.

In step A15, the update termination determiner 15 determines whether or not an update termination condition is satisfied. The update termination condition is, for example, a fact that the number of iterations of steps A12 to A14 (the number of updates) reaches a threshold value. While the update termination condition is not satisfied (NO), steps A12 to A14 are iterated. When the update termination condition is satisfied (YES), the processing advances to step A16.

In step A16, data on the plurality of updated feature waveforms and data on the updated weight vector are output and stored in the output information storage 20. Note that when a feature waveform with a weight of 0 exists, the feature waveform does not need to be output. Moreover, such an element of a weight of 0 is eliminated from the weight vector (the weight vector is lightened by the number of eliminated elements).

<Test Phase>

In the test phase, a set of feature waveforms and a weight vector that are learnt are given as inputs, a score of a time series data sequence for test is calculated, and a positive label or a negative label is determined for the time series data sequence (it is determined whether the time series data sequence is normal or anomalous), based on the calculated score. Hereinafter, details will be described.

In the test phase, the input setter 10, the test data storage 19, the output information storage 20, the feature vector generator 11, the predictor 16, and the display 17 are used.

In the output information storage 20, the updated feature waveform set S (including the K updated feature waveforms) and the updated weight vector (model parameter) W that are ultimately acquired in the learning phase are stored.

In the test data storage 19, a time series data sequence to be tested is stored. The time series data sequence is based on values detected by a sensor provided to an analysis-target apparatus to be tested.

The input setter 10 reads the time series data sequence to be tested from the test data storage 19 and inputs the read time series data sequence into the feature vector generator 11.

The feature vector generator 11 reads the time series data sequence to be tested (denoted by "t") and calculates a K-dimensional feature vector (denoted by "Xt") based on distances between the time series data sequence and the feature waveform set S.

The predictor 16 calculates a score based on the feature vector Xt and the weight vector W. Specifically, an equation of the classification model (an equation for calculating a score) is as follows.

$$Y=Xt\cdot W \tag{13}$$

At the time, the score is calculated by calculating an inner product of the feature vector Xt and the weight vector W. For example, when K=2, when the feature vector Xt is ($X_{t,1}$, $X_{t,2}$), and when the weight vector W is ($w_1$, $w_2$), the score is calculated as "$X_{t,1}\cdot w_1+X_{t,2}\cdot w_2$".

The predictor 16 compares the calculated score with a threshold value. As described above, the threshold value may be a value determined by the update termination determiner 15, or may be a predetermined value. When the score is not smaller than the threshold value, it is determined that the time series data sequence to be tested is normal, and a positive label is assigned. When the score is smaller than the threshold value, it is determined that the time series data sequence to be tested is anomalous, and a negative label is assigned.

The display 17 displays data based on a result of the evaluation by the predictor 16 (resultant data of evaluation) in a screen. The resultant data of evaluation includes the time series data sequence to be tested, information on the assigned label (a determination result that is either "normal" or "anomalous"), the feature waveforms placed at locations closest to the time series data sequence, and the calculated score. The resultant data of evaluation has a similar format as the resultant data of learning described above. The resultant data of evaluation may be displayed only when the determination result is "anomalous". The output information storage 20 may internally store the resultant data of evaluation.

Figure 15:
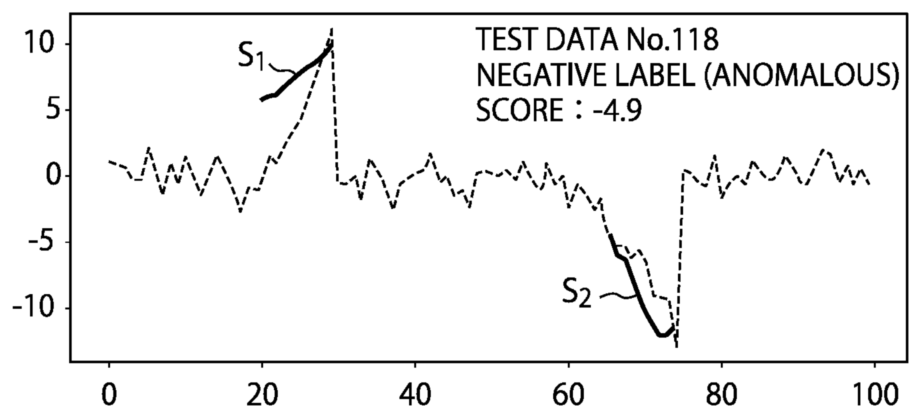
FIG. 15 shows an example of resultant data of evaluation displayed on the display.

FIG. 15 shows an example of the resultant data of evaluation displayed on the display 17. A time series data sequence to be tested (test data No. 118) is displayed. The feature waveforms $S_1$, $S_2$ are placed at locations closest to the time series data sequence, respectively. The feature waveform $S_2$ fits a partial waveform of the time series data sequence. The score is −4.9, and a negative label is assigned. In other words, it is determined that the time series data sequence is anomalous (anomaly occurs with the analysis-target apparatus). Information indicating that anomaly is determined is displayed. The information and the score are an example of the score-based information. A user can determine occurrence of anomaly by checking the resultant data of evaluation. Moreover, the user can identify evidence for the determination of anomaly, based on which feature waveform fits the time series data sequence. For example, when the feature waveform $S_2$ fits the time series data sequence, it can be determined that less-frequently occurring anomaly occurs.

Note that when the support vector set Sv and the contribution rate set Sa are used for the weight vector (model parameter) W, a classification model is generated as follows. (Sa, Sv) corresponds to a model parameter for a classification boundary, "X" corresponds to an input variable (feature vector). "Y" is an output. It is defined that "−Y" obtained by multiplying "Y" by −1 is a degree of anomaly. "K" is a kernel function, and "Sv" is a set of support vectors S'v. "Sa" is a set of contribution rates S'a of the support vectors belonging to "Sv".

[Expression 4]

$$Y=\Sigma_{(S'_a,S'_v)\in(S_a,S_v)}S'_a K(S'_v,X) \tag{14}$$

When the calculated degree of anomaly "−Y" is not smaller than a threshold value, the predictor 16 determines that the time series data sequence to be tested is anomalous, and assigns a negative label. When the degree of anomaly "−Y" is smaller than the threshold value, the predictor 16 determines that the time series data sequence to be tested is normal, and assigns a positive label.

Figure 16:
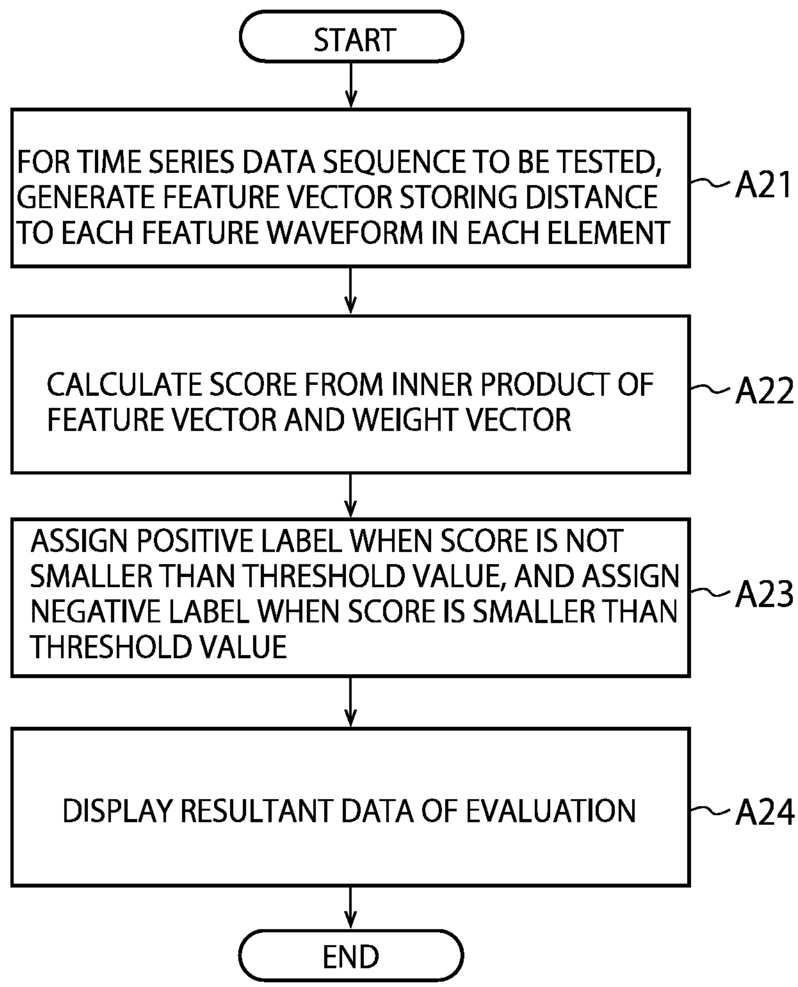
FIG. 16 is a flowchart of operation in a test phase.

FIG. 16 is a flowchart of operation in the test phase.

In step A21, the feature vector generator 11 calculates a distance between a time series data sequence to be tested and each learnt feature waveform and generates a feature vector storing the calculated distances in elements corresponding to the individual feature waveforms, respectively.

In step A22, the predictor 16 calculates a score (evaluation value) from an inner product of the feature vector and a learnt weight vector.

In step A23, the predictor 16 compares the calculated score with a threshold value. When the score is not smaller than the threshold value, the predictor 16 determines that the time series data sequence to be tested is normal, and assigns a positive label. When the score is smaller than the threshold value, the predictor 16 determines that the time series data sequence to be tested is anomalous (anomaly occurs with an analysis-target apparatus), and assigns a negative label.

In step A24, the display 17 displays resultant data of evaluation in a screen. The resultant data of evaluation includes, as examples, the time series data sequence to be tested, information on the assigned label (a determination result that is either "normal" or "anomalous"), the feature waveforms placed at locations closest to the time series data sequence, and the calculated score.

In the present embodiment, an example is shown in which a range of the false positive rate as the performance indicator parameter is specified directly from the GUI. However, a name of the performance indicator parameter that is presented to a user as an adjustable parameter is not necessarily "false positive rate". For example, a parameter for adjusting a degree of importance placed on erroneous detection and overlooking may be presented to a user as an adjustable parameter. Alternatively, a parameter for adjusting the number of higher rankings (the number of time series data sequences counted in descending or ascending order of scores) for which importance is placed on correctness of determination may be presented to a user as an adjustable parameter. In any case, a parameter value specified by a user is internally replaced with a range of the false positive rate, in learning of the apparatus. For example, such replacement is achieved by storing, in the learning data storage 18 beforehand, information (for example, a function or a table) in which parameter values specified by a user and ranges of the false positive rate are associated with each other. Processing thereafter is similar to the processing described above in the present embodiment.

Figure 17:
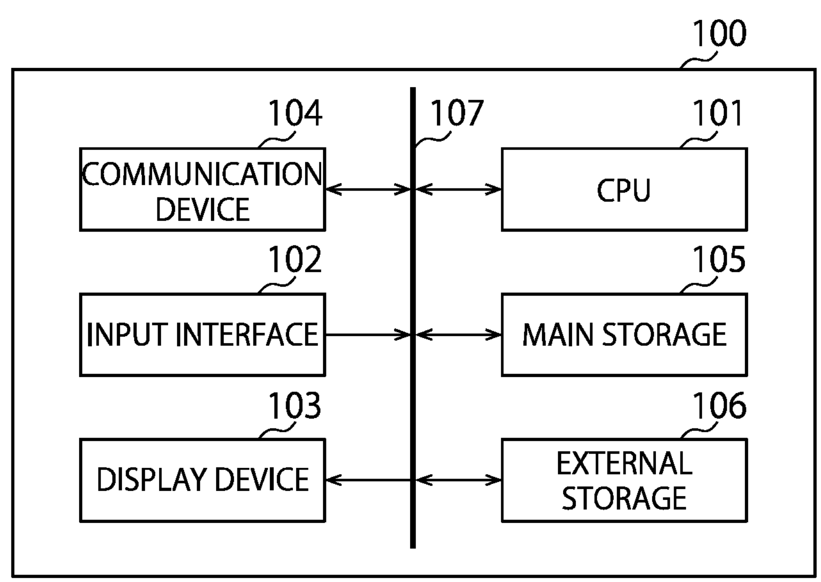
FIG. 17 shows a hardware configuration of the time series data analysis apparatus according to the present embodiment.

FIG. 17 shows a hardware configuration of the time series data analysis apparatus according to the present embodiment. The time series data analysis apparatus according to the present embodiment is configured by using a computer apparatus 100. The computer apparatus 100 includes a CPU

101, an input interface 102, a display device 103, a communication device 104, a main storage 105, and an external storage 106, which are connected to each other through a bus 107.

The CPU (Central Processing Unit) 101 executes an analysis program that is a computer program on the main storage 105. The analysis program is a program that implements each of the above-mentioned functional components of the time series data analysis apparatus. Each functional component is implemented by the CPU 101 executing the analysis program.

The input interface 102 is a circuit for inputting operation signals from input devices such as a keyboard, a mouse, and a touch panel to the time series data analysis apparatus.

The display device 103 displays data or information output from the time series data analysis apparatus. Examples of the display device 103 include, but are not limited to, an LCD (Liquid Crystal Display), a CRT (Cathode Ray Tube), and a PDP (Plasma Display Panel). The data or the information stored in the learning data storage 18, the test data storage 19, and the output information storage 20 can be displayed by the display device 103.

The communication device 104 is a circuit for allowing the time series data analysis apparatus to perform wireless or wired communication with an external apparatus. Data such as input data for learning or a time series data sequence for test can be input from the external apparatus via the communication device 104. The data input from the external apparatus can be stored in the learning data storage 18 or the test data storage 19.

The main storage 105 stores the analysis program, data required to execute the analysis program, data generated as a result of execution of the analysis program, and the like. The analysis program is deployed on the main storage 105 and executed. Examples of the main storage 105 include, but are not limited to, a RAM, a DRAM, and an SRAM. The learning data storage 18, the test data storage 19, and the output information storage 20 may be constructed on the main storage 105.

The external storage 106 stores the analysis program, data required to execute the analysis program, data generated as a result of execution of the analysis program, and the like. The program and the data are read onto the main storage 105 when the analysis program is executed. Examples of the external storage 106 include, but are not limited to, a hard disk, an optical disk, a flash memory, and a magnetic tape. The learning data storage 18, the test data storage 19, and the output information storage 20 may be constructed on the external storage 106.

Note that the analysis program may be preinstalled in the computer apparatus 100, or may be stored in a storage medium such as a CD-ROM. The analysis program may be uploaded to the Internet.

Although the time series data analysis apparatus includes a configuration that performs both the learning phase and the test phase in the present embodiment, a configuration that performs any one phase may be made. In other words, an apparatus that performs the learning phase and an apparatus that performs the test phase may be configured separately.

For a classification model, although SVM is used in the present embodiment, any other model such as a logistics regression model may be used.

As described above, according to the present embodiment, weights of a classification model for time series data sequences are learnt such that a performance indicator such as pAUC is optimized. Accordingly, by generating the classification model in accordance with a condition of the performance indicator (for example, a range of the false positive rate), high prediction performance under the condition can be achieved. Moreover, in the present embodiment, feature waveforms effective in prediction under the condition can be learnt.

According to the present embodiment, feature waveforms effective in prediction can be learnt while the performance indicator such as pAUC is directly optimized in a time series data sequence. When a label (presence or absence of anomaly) of a time series data sequence is predicted, it is possible to make prediction with higher accuracy based on the learnt weights, and also to present evidence for the prediction (which feature waveform fits the time series data sequence).

By optimizing pAUC as a performance indicator, for example, it is possible to respond to demand for: (1) correct prediction of troubles under a situation where a rate of overlooking troubles is kept at a sufficiently low level; (2) correct prediction of diagnosis cases under a situation where a rate of misdiagnoses is restrained to a low level; (3) enhanced accuracy in prediction of a small number of higher rankings, and the like.

Second Embodiment

In the present embodiment, a large number of feature waveforms are designated for learning first, and the feature waveforms are narrowed down to feature waveforms effective in prediction through sparse modeling.

Figure 18:
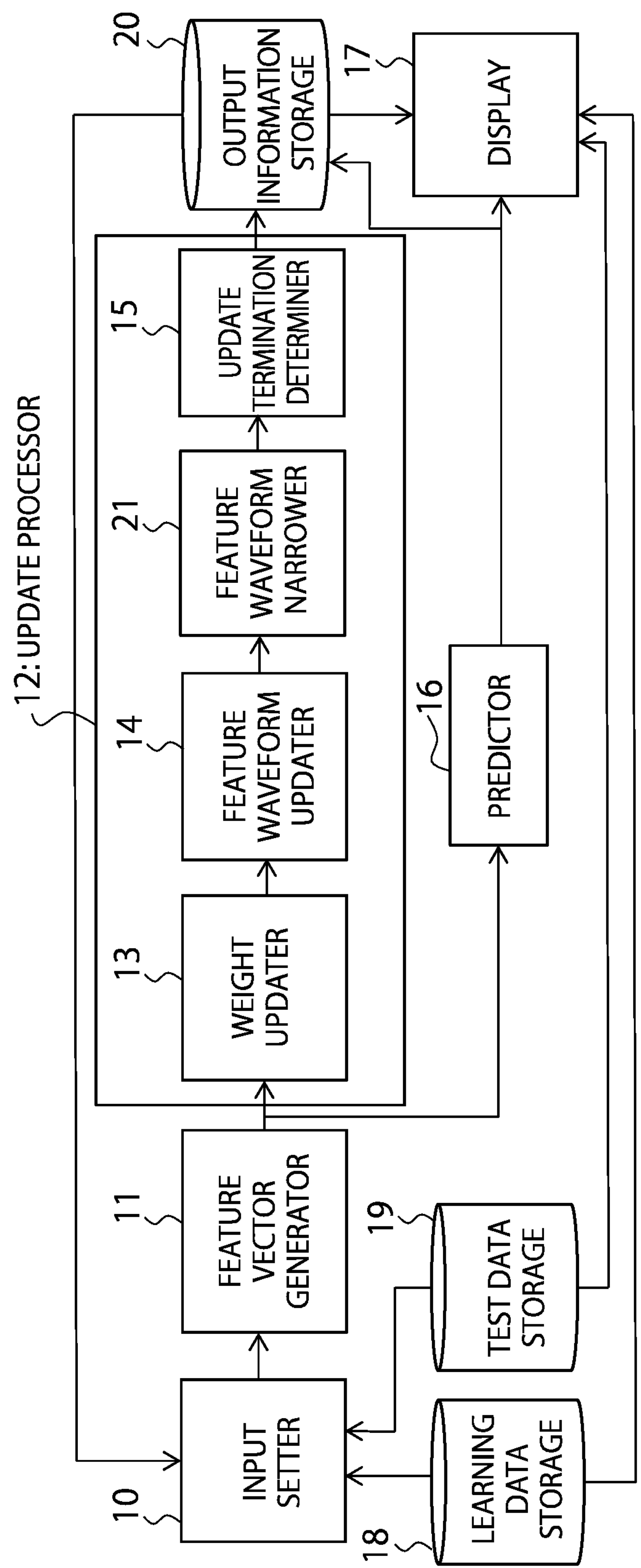
FIG. 18 is a block diagram of a time series data analysis apparatus according to a second embodiment.

FIG. 18 is a block diagram of a time series data analysis apparatus according to the second embodiment. A feature waveform narrower 21 is added. Since the other blocks are similar to the blocks in FIG. 1, a description of such blocks is omitted except extended or changed functions.

In the first embodiment, for the number of feature waveforms as parameter information on feature waveforms, a desired number or a number close to the desired number, for example, "2" is specified. In contrast, in the present embodiment, the input setter 10 specifies a sufficiently larger number than numbers in the first embodiment, for example, a maximum number (for example, "500").

The weight updater 13 uses L1 norm (Lasso) regularization for a constraint of regularization in an optimization problem (see the expression (4)). In other words, p=1. Although L2 norm regularization (p=2) is used in the first embodiment, L1 norm regularization (p=1) is used in the present embodiment.

With the change, the weight updater 13 uses the projected gradient descent method based on L1 norm regularization. Although the L2 ball is used for projection due to the constraint of L2 norm regularization in the first embodiment, an L1 ball representing L1 norm distances (Manhattan distances) is used for projection in the present embodiment, due to a constraint of L1 norm regularization. The L1 ball is a square having a distance X, from the origin to each vertex and indicates a range of possible values of the weight vector W. As an example, "λ" is 1. However, "λ" may be larger than 1, or may be smaller than 1. When the weight vector W decreased by a value of "δH/δW" does not satisfy the constraint of L1 norm regularization, the decreased weight vector W is projected onto the L1 ball. The projection is performed onto such a location on a side that makes the shortest Euclidean distance. A value of the location of projection is set as the updated weight vector W.

Figure 19:
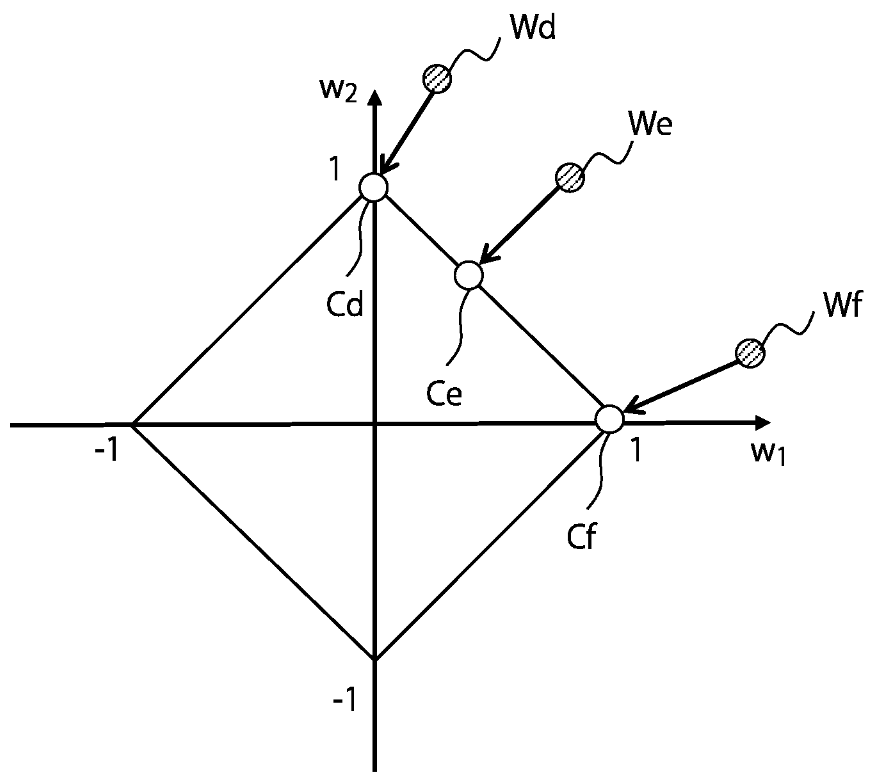
FIG. 19 shows an example in which a weight vector is projected onto an L1 ball.

FIG. 19 shows the L1 ball when "λ" is 1 and an example in which the weight vector W is projected onto the L1 ball. A decreased weight vector Wd is located outside the L1 ball.

The projection is performed from a location of the weight vector Wd onto such a location on a side that makes the shortest Euclidean distance. A value of a projection point Cd is set as updated "W". When a decreased weight vector is "We" or "Wf", the projection onto the L1 ball is similarly performed onto such a location on a side that makes the shortest Euclidean distance. An intersection Cf or Cg with the L1 ball is calculated, and a value of the calculated intersection Cf or Cg is set as updated "W".

Since an intersection of the L1 ball and each axis is sharp in comparison with the case of the L2 ball (see FIG. 6), projection occurs on the intersections in more cases, and as a result, some of components of the weight vector become or easily become 0.

Operation of the feature waveform updater 14 is similar to the operation in the first embodiment.

Based on the weight vector updated by the weight updater 13, the feature waveform narrower 21 determines whether or not an element with a weight of 0 exists and, when an element with a weight of 0 exists, deletes a feature waveform corresponding to the element. In other words, the plurality of currently existing feature waveforms are narrowed down to feature waveforms with weights that are not 0. The length of the weight vector is shortened by the number of elements deleted.

The update termination determiner 15 determines whether or not an update termination condition is satisfied, and the operation of the feature vector generator 11, the weight updater 13, the feature waveform updater 14, and the feature waveform narrower 21 is iterated until the update termination condition is satisfied. The update termination condition is similar to the update termination condition in the first embodiment.

In L1 norm regularization, weights of many of the components ultimately become 0. The update termination determiner 15 does not output, as a result of learning, the feature waveforms with weights that ultimately become 0. The feature waveforms with weights that are not 0 are output as the learnt feature waveforms and stored in the output information storage 20. Thus, it is possible to learn a classification model (weight vector W) attaining higher prediction accuracy and a requisite minimum number of feature waveforms attaining higher detection accuracy than the classification model and feature waveforms in the first embodiment. Although the feature waveforms with weights that are not 0 are output, a configuration is also possible in which only feature waveforms with weights that are not smaller than a predetermined value are output, without outputting feature waveforms with weights that are smaller than the predetermined value.

Figure 20:
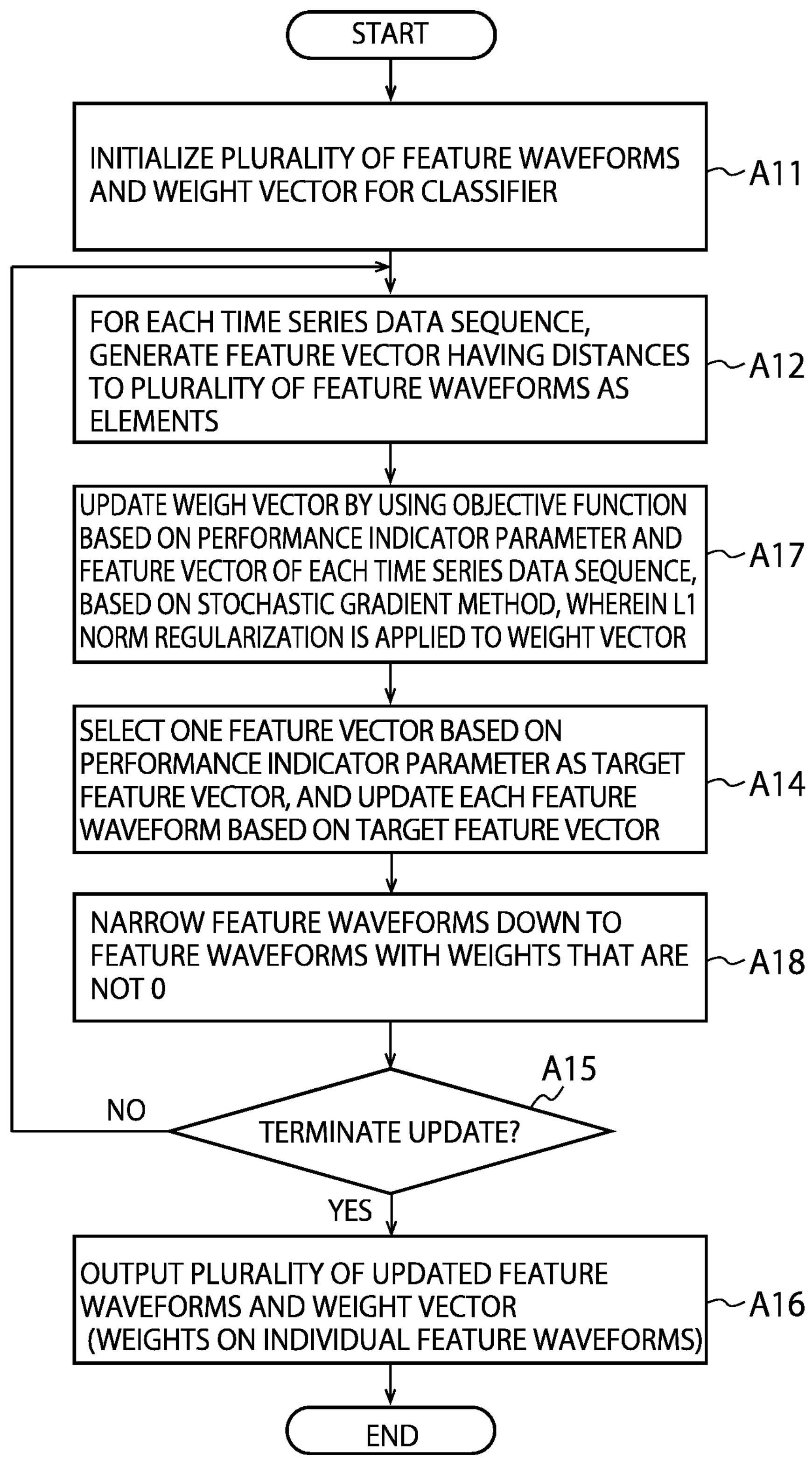
FIG. 20 is a flowchart of operation in a learning phase according to the second embodiment.

FIG. 20 is a flowchart of operation in a learning phase according to the second embodiment.

Steps A11, A12 are identical to step A11, A12 in the first embodiment shown in FIG. 14.

Step A17 is identical to step A13 in the first embodiment shown in FIG. 14, except processing for satisfying the constraint of L1 norm regularization. Although L2 norm regularization is used in step A13 in the first embodiment, L1 norm regularization is used in step A17 in the present embodiment. In other words, it is determined whether or not the weight vector decreased by a value of "δH/δW" satisfies the constraint of L1 norm regularization (see the expression (4)). When the constraint is not satisfied, the weight vector is updated by projecting the decreased weight vector onto the L1 ball (see FIG. 19). When the constraint of L1 norm regularization is satisfied, the decreased weight vector is set as the updated weight vector.

Step A14 is identical to step A14 in the first embodiment shown in FIG. 14.

In step A18, the feature waveform narrower 21 determines, based on the updated weight vector, whether or not an element with a weight of 0 exists and, when an element with a weight of 0 exists, deletes a feature waveform corresponding to the element. In other words, the plurality of currently existing feature waveforms are narrowed down to feature waveforms with weights that are not 0.

Step A15 is identical to step A15 in the first embodiment shown in FIG. 14.

In step A19, data on the one or more updated feature waveforms (one or more ultimately remaining feature waveforms, that is, feature waveforms with weights that are not 0) and data on the updated weight vector are output and stored in the output information storage 20.

As described above, according to the present embodiment, while a large number of initial feature waveforms are narrowed down by using sparse modeling, a feature waveform effective in prediction can be learnt. Moreover, a classification model (weights) attaining higher accuracy can be learnt.

Third Embodiment

A third embodiment shows an embodiment of a time series data analysis system in which a time series data analysis apparatus is connected to an analysis-target apparatus through a communication network.

Figure 21:
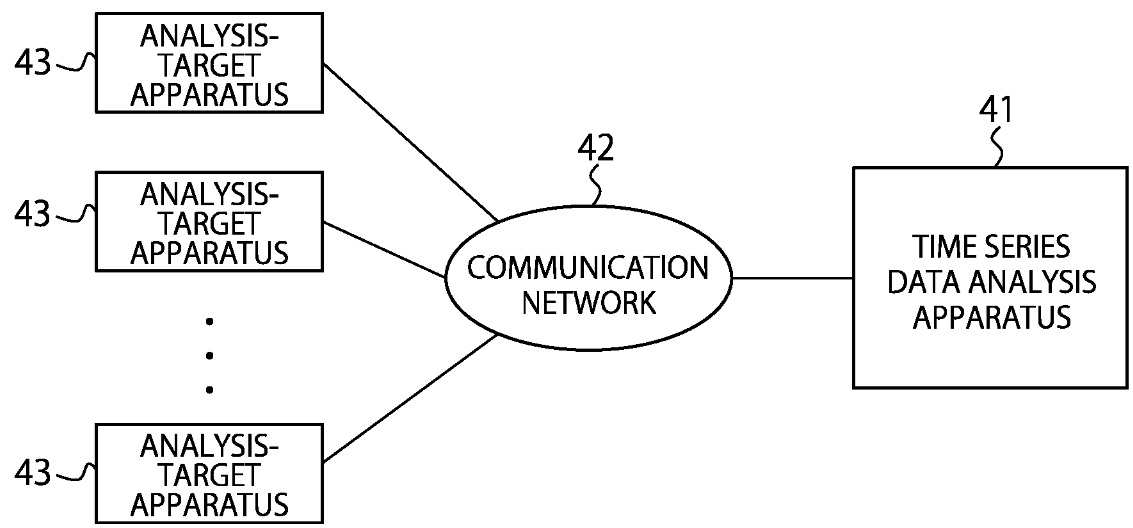
FIG. 21 shows a time series data analysis system according to a third embodiment.

FIG. 21 shows a time series data analysis system according to a third embodiment. A time series data analysis apparatus 41 corresponds to the time series data analysis apparatus according to any one of the first and second embodiments. The time series data analysis apparatus 41 is connected to a plurality of analysis-target apparatuses 43 through a communication network 42. A sensor that detects a physical amount is mounted in each analysis-target apparatus 43. Each analysis-target apparatus 43 generates a time series data sequence based on values detected by the sensor and transmits the generated time series data sequence to the time series data analysis apparatus 41 through the communication network 42. When time series data sequences are collected for the learning phase, the time series data analysis apparatus 41 checks beforehand which one of a normal state and an anomalous state each analysis-target apparatus 43 is in. The time series data analysis apparatus 41 assigns a positive label to each time series data sequence received from any analysis-target apparatus 43 in the normal state, and assigns a negative label to each time series data sequence received from any analysis-target apparatus 43 in the anomalous state and stores the time series data sequences in the learning data storage 18. When a time series data sequence is collected for the test phase, the time series data analysis apparatus 41 stores the received time series data sequence in the test data storage 19. Thus, each analysis-target apparatus 43 can be tested for anomaly in real-time.

While certain approaches have been described, these approaches have been presented by way of example only, and are not intended to limit the scope of the inventions. Indeed, the apparatuses described herein may be embodied in a variety of other forms; furthermore various omissions, substitutions and changes in the form of the apparatuses described herein may be made. The accompanying claims and their equivalents are intended to cover such forms or modifications as would fall within the scope of the inventions.

The invention claimed is:

1. A time series data analysis method, comprising:

outputting a graphical user interface (GUI) to receive input, from a user, a performance indicator parameter being a parameter for specifying a range of false positive rates in pAUC (partial Area Under the Curve), which is an indicator for evaluation of a support vector machine (SVM) model;

setting a value of the performance indicator parameter based on user input information that is input from the GUI;

performing a learning phase to simultaneously learn a model parameter of the SVM model and optimal feature waveforms, by:

performing, by processing circuitry, a first process that calculates, for each of a plurality of first time-series data sequences, which are time series-data sequences belonging to a normal class among a plurality of time-series data sequences detected by a sensor in a target-analysis device, distances to a plurality of feature waveforms given as initial waveforms, the initial waveforms being different from and shorter than the plurality of time-series data sequences, and generates a plurality of first feature vectors each including feature amounts of the plurality of feature waveforms based on the calculated distances, for the plurality of first time-series data sequences;

performing, by the processing circuitry, a second process that calculates, for each of a plurality of second time-series data, which are time series-data belonging to an anomalous class among the plurality of time-series data detected by the sensor, distances to the plurality of feature waveforms and generates a plurality of second feature vectors each including feature amounts of the plurality of feature waveforms based on the calculated distances, for the plurality of second time-series data sequences;

calculating, by the processing circuitry, a first number being a number of second feature vectors to be used in an update process among the generated second feature vectors, based on the value of the performance index parameter and based on a number of the plurality of second-time series data sequences belonging to the anomalous class, wherein the first number of second feature vectors is calculated as a largest integer that does not exceed a multiplied value obtained by multiplying an upper limit of the range of false positive rates specified by the performance indicator parameter and the number of the plurality of second time-series data sequences;

performing, by the processing circuitry, the update process that calculates a plurality of second scores representing values of a magnitude of probability that the target-analysis device belongs to the normal class based on the plurality of second feature vectors and the model parameter of the SVM model, the model parameter including initial values of weights of the plurality of feature waveforms, selects second feature vectors of the determined first number from the plurality of second feature vectors based on the plurality of second feature vectors, and updates the model parameter and the plurality of feature waveforms simultaneously based on the plurality of first feature vectors and the selected second feature vectors; and iterating, by the processing circuitry, the first process, the second process, and the update process in sequence until a termination condition is satisfied, thereby obtaining the optimal feature waveforms as the finally updated plurality of feature waveforms, and the learned model parameter; and performing a test phase using the optimal feature waveforms and the learned model parameter, by:

receiving, by communication circuitry, a test targeted time-series data sequence from the target-analysis device via a network, the test target time-series data being output by the sensor;

calculating, by prediction circuitry, distances between the received time-series data sequence and the optimal feature waveforms;

generating, by the prediction circuitry, a third feature vector including feature amounts of the optimal feature waveforms, based on the calculated distances; and calculating, by the prediction circuitry, a score based on the third feature vector and the learned model parameter, and comparing the calculated score with a threshold value to predict a class of the test targeted time-series data as one of the normal class and the anomalous class, wherein the pAUC is maximized in the specified range of false positive rates specified by the user via the GUI when the threshold value corresponds to the upper limit of the specified range of false positive rates, the GUI includes a screen that includes an adjustment bar allowing the user to specify an upper limit of the range of the false positive rates as the range of false positive rates, a lower limit of the range of the false positive being zero or a predetermined value less than the upper limit, and fields for the user to specify a number K of feature waveforms and a length L of the feature waveforms, the method further comprises obtaining, by the processing circuitry, the user input information including the range of false positive rates corresponding to a position of the adjustment bar adjusted by the user in the GUI to set the value of the performance indicator parameter based on the user input information, and generating, by the processing circuitry, the initial waveforms of the number K specified by the user in the user interface, the initial waveforms having the length L specified by the user in the GUI, and the method further comprises displaying, on a display, the calculated score, the predicted class, and the optimal feature waveforms in association with the test targeted time-series data sequence.

2. The method according to claim 1, wherein the updating process further comprises calculating, for the plurality of first time-series data, a plurality of first scores relating to the magnitude of the probability of belonging to the normal class based on the plurality of first feature vectors and the model parameter, calculating, for the plurality of second time-series data, a plurality of second scores relating to the magnitude of the probability of belonging to the normal class based on the plurality of second feature vectors and the model parameter, identifying the determined first number of second feature vectors from among the plurality of second feature vectors in a descending order of the second scores, generating an ordering matrix that one of rows or columns of a matrix is assigned to the determined first number of second feature vectors and the other of the row or columns is assigned to the first feature vectors, elements of the matrix are stored with 0 or 1 depending on a relationship between the second score of the second feature vector and the first score of the first feature vector, and a number of the columns or the rows to which the determined first number of second feature vectors is assigned is equal to the determined first number, updating the model parameter based on the identified second feature vectors and the ordering matrix using a stochastic gradient method, selecting a class from the normal class and the anomalous class at random or alternately or with equal probability, in response to the normal class being selected, randomly selecting one first feature vector as a first target feature vector from the plurality of first feature vectors, and updating the plurality of feature waveforms based on the first target feature vector, the identified second feature vectors, and the ordering matrix, using the stochastic gradient method, and in response to the anomalous class being selected, randomly selecting one second feature vector from the identified second feature vectors as a second target feature vector, and updating the plurality of feature waveforms based on the second target feature vector, the identified second feature vectors, and the ordering matrix, using the stochastic gradient method.

3. The method according to claim 2, wherein the update process further comprises determining the ordering matrix by assigning the determined first number of second feature vectors to one of the columns or rows of the matrix so as to obtain a maximum value of an objective function, the objective function including the ordering matrix, the identified second feature vectors, and the model parameter, as input variables, and by calculating a value of each element of the matrix based on the assigned second feature vectors and the first feature vectors assigned the other of the columns or rows.

4. The method according to claim 1, wherein the plurality of feature waveforms minimizes an objective function with L1 norm regularization related to the model parameter, the objective function including variables representing the weights representing the plurality of feature waveforms, to thereby update the weights, and the method further comprises obtaining feature waveforms with a non-zero weight among the plurality of feature waveforms as the finally updated feature waveforms.

5. The method according to claim 1, wherein the method further comprises:

extracting, by the processing circuitry, a plurality of partial waveforms of the length L from each of the plurality of time-series data sequences detected by the sensor, generating K clusters by clustering the extracted partial waveforms, and calculating K centroids of respective K clusters, wherein the calculated K centroids are the initial waveforms.

6. A time series data analysis apparatus, comprising:

a display configured to output a graphical user interface (GUI) to receive input, from a user, of a performance indicator parameter being a parameter for specifying a range of false positive rates in pAUC (partial Area Under the Curve), which is an indicator for evaluation of a support vector machine (SVM) model;

processing circuitry configured to set a value of the performance indicator parameter based on user input information that is input from the GUI;

perform a learning place to simultaneously learn a model parameter of the SVM model and optimal feature waveforms, by:

performing a first process that calculates, for each of a plurality of first time-series data sequences, which are time series-data sequences belonging to a normal class among a plurality of time-series data sequences detected by a sensor in an target-analysis device, distances to a plurality of feature waveforms given as initial waveforms, the initial waveforms being different from and shorter than the plurality of time-series data sequences, and generates a plurality of first feature vectors each including feature amounts of the plurality of feature waveforms based on the distances, for the plurality of first time-series data sequences;

performing a second process that calculates, for each of a plurality of second time-series data, which are time series-data belonging to an anomalous class among the plurality of time-series data detected by the sensor, distances to the plurality of feature waveforms and generates a plurality of second feature vectors each including feature amounts of the plurality of feature waveforms based on the distances, for the plurality of second time-series data sequences; and determining a first number being a number of second feature vectors to be used in an update process based on the value of the performance index parameter and based on a number of the plurality of second time-series data sequences belonging to the anomalous class, wherein the first number of second feature vectors is calculated as a largest integer that does not exceed a multiplied value obtained by multiplying an upper limit of the range of false positive rates specified by the performance indicator parameter and the number of the plurality of second time-series data sequences;

performing the update process that calculates a plurality of second scores representing values of a magnitude of probability that the target-analysis device belongs to the normal class based on the plurality of second feature vectors and the model parameter of the SVM model, the model parameter including initial values of weights of the plurality of feature waveforms, selects second feature vectors of the determined number from the plurality of second feature vectors based on the plurality of second feature vectors, and updates the model parameter and the plurality of feature waveforms simultaneously based on the plurality of first feature vectors and the selected second feature vectors; and iterating the first process, the second process, and the update process in sequence until a termination condition is satisfied, thereby obtaining the optimal feature waveforms as the finally updated plurality of feature waveforms, and the learned model parameter;

communication circuitry configured to receive a test targeted time-series data sequence from the target-analysis device via a network, the test target time-series data being output by the sensor; and prediction circuitry configured to perform a test phase using the optimal feature waveforms and the learned model parameter, by calculating distances between the received time-series data sequence and the optimal feature waveforms;

generating a third feature vector including feature amounts of the optimal feature waveforms, based on the calculated distances; and calculating a score based on the third feature vector and the learned model parameter, and compare the calculated score with a threshold value to predict a class of the test targeted time-series data as one of the normal class and the anomalous class, wherein the pAUC is maximized in the specified range of false positive rates specified by the user via the GUI when the threshold value corresponds to the upper limit of the specified range of false positive rates, the GUI includes a screen that includes an adjustment bar allowing the user to specify an upper limit of the range of the false positive rates as the range of false positive rates, a lower limit of the range of the false positive being zero or a predetermined value less than the upper limit, and fields for the user to specify a number K of feature waveforms and a length L of the feature waveforms, the processing circuitry is further configured to obtain the user input information including the range of false positive rates corresponding to a position of the adjustment bar adjusted by the user in the GUI to set the value of the performance indicator parameter based on the user input information, the processing circuitry is further configured to generate the initial waveforms of the number K specified by the user in the user interface, the initial waveforms having the length L specified by the user in the GUI, and the processing circuitry is further configured to control the display to display the calculated score, the predicted class, and the optimal feature waveforms in association with the test targeted time-series data sequence.

7. A non-transitory computer readable medium having a computer program stored therein which causes a computer executing the computer program to perform a method, comprising:

outputting a graphical user interface (GUI) to receive input, from a user, of a performance indicator parameter being a parameter for specifying a range of false positive rates in pAUC (partial Area Under the Curve), which is an indicator for evaluation of a support vector machine (SVM);

setting a value of the performance indicator parameter based on user input information which is input from the GUI;

performing a learning phase to simultaneously learn a model parameter of the SVM model and optimal feature waveforms, by:

performing a first process that calculates, for each of a plurality of first time-series data sequences, which are time series-data sequences belonging to a normal class among a plurality of time-series data sequences detected by a sensor in an target-analysis device, distances to a plurality of feature waveforms given as initial waveforms, the initial waveforms being different from and shorter than the plurality of time-series data sequences, and generates a plurality of first feature vectors each including feature amounts of the plurality of feature waveforms based on the distances, for the plurality of first time-series data sequences;

performing a second process that calculates, for each of a plurality of second time-series data, which are time series-data belonging to an anomalous class among the plurality of time-series data detected by the sensor, distances to the plurality of feature waveforms and generates a plurality of second feature vectors each including feature amounts of the plurality of feature waveforms based on the distances, for the plurality of second time-series data sequences;

determining a first number being a number of second feature vectors to be used in an update process based on the value of the performance index parameter and based on a number of the plurality of second time-series data belonging to the anomalous class, wherein the first number of second feature vectors is calculated as a largest integer that does not exceed a multiplied value obtained by multiplying an upper limit of the range of false positive rates specified by the performance indicator parameter and the number of the plurality of second time-series data sequences;

performing the update process that calculates a plurality of second scores representing values of a magnitude of probability that the target-analysis device belongs to the normal class based on the plurality of second feature vectors and the model parameter of the SVM model, the model parameter including initial values of weights of the plurality of feature waveforms, selects second feature vectors of the determined first number from the plurality of second feature vectors based on the plurality of second feature vectors, and updates the model parameter and the plurality of feature waveforms simultaneously based on the plurality of first feature vectors and the selected second feature vectors; and iterating the first process, the second process, and the update process in sequence until a termination condition is satisfied, thereby obtaining the optimal feature waveforms as the finally updated plurality of feature waveforms and the learned model parameter; and performing a test phase using the optimal feature waveforms and the learned model parameter, by;

receiving, by communication circuitry, a test targeted time-series data sequence from the target-analysis device via a network, the test target time-series data being output by the sensor;

calculating, by prediction circuitry, distances between the received time-series data sequence and the optimal feature waveforms;

generating, by the prediction circuitry, a third feature vector including feature amounts of the optimal feature waveforms, based on the calculated distances; and calculating, by the prediction circuitry, a score based on the third feature vector and the learned model parameter, and comparing the calculated score with a threshold value to predict a class of the test targeted time-series data as one of the normal class and the anomalous class, wherein the pAUC is maximized in the specified range of false positive rates specified by the user via the GUI when the threshold value corresponds to the upper limit of the specified range of false positive rates, the GUI includes a screen that includes an adjustment bar allowing the user to specify an upper limit of the range of the false positive rates as the range of false positive rates, a lower limit of the range of the false positive being zero or a predetermined value less than the upper limit, and fields for the user to specify a number K of feature waveforms and a length L of the feature waveforms, the method further comprises obtaining the user input information including the range of false positive rates corresponding to a position of the adjustment bar adjusted by the user in the GUI to set the value of the performance indicator parameter based on the user input information, and generating, by the processing circuitry, the initial waveforms of the number K specified by the user in the GUI, the initial waveforms having the length L specified by the user in the user interface, and the method further comprises displaying, on a display, the calculated score, the predicted class, and the optimal feature waveforms in association with the test targeted time-series data sequence.

* * * * *